United States Patent
Miyawaki

(10) Patent No.: US 12,258,012 B2
(45) Date of Patent: Mar. 25, 2025

(54) VEHICLE DRIVING SUPPORT DEVICE

(71) Applicant: TOYOTA JIDOSHA KABUSHIKI KAISHA, Toyota (JP)

(72) Inventor: Jiro Miyawaki, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 188 days.

(21) Appl. No.: 17/966,931

(22) Filed: Oct. 17, 2022

(65) Prior Publication Data

US 2023/0126820 A1  Apr. 27, 2023

(30) Foreign Application Priority Data

Oct. 27, 2021  (JP) ................... 2021-175777

(51) Int. Cl.
  *B60W 30/12* (2020.01)
  *B60W 60/00* (2020.01)

(52) U.S. Cl.
  CPC .......... *B60W 30/12* (2013.01); *B60W 60/001* (2020.02); *B60W 2510/20* (2013.01); *B60W 2540/18* (2013.01); *B60W 2552/30* (2020.02); *B60W 2710/20* (2013.01)

(58) Field of Classification Search
  CPC ............... B60W 30/12; B60W 60/001; B60W 2552/30; B60W 2510/20; B60W 2540/18; B60W 2710/20
  See application file for complete search history.

(56) References Cited

U.S. PATENT DOCUMENTS

| | | | |
|---|---|---|---|
| 2012/0239255 A1* | 9/2012 | Kojima | B62D 15/025 701/42 |
| 2016/0132055 A1 | 5/2016 | Matsuno et al. | |
| 2018/0201318 A1* | 7/2018 | Kataoka | G06V 20/588 |
| 2019/0152523 A1* | 5/2019 | Hajika | B62D 6/005 |
| 2019/0202454 A1* | 7/2019 | Komiyama | G08G 1/166 |
| 2020/0255012 A1* | 8/2020 | Sato | B60W 30/16 |
| 2022/0212717 A1 | 7/2022 | Saito | |

FOREIGN PATENT DOCUMENTS

| | | |
|---|---|---|
| JP | 2015-3566 A | 1/2015 |
| JP | 2016-88383 A | 5/2016 |
| WO | 2014/203791 A1 | 12/2014 |
| WO | 2018/038147 A1 | 3/2018 |
| WO | 2020/230301 A1 | 11/2020 |

* cited by examiner

*Primary Examiner* — Aaron L Troost
(74) *Attorney, Agent, or Firm* — Sughrue Mion, PLLC

(57) ABSTRACT

A vehicle driving support device sets a steering force of a reference value as an intervention steering force to set a target steering force and executes lane deviation suppression control, when a straight lane deviation condition or a curve inner lane deviation condition is satisfied while a pre-intervention in-phase condition is not satisfied. The pre-intervention in-phase condition is a condition that a steering operation force that is equal to or larger than a predetermined value and that is applied in a direction of returning an own vehicle that has deviated from a lane to the lane is being input to the own vehicle by a driver of the own vehicle.

3 Claims, 14 Drawing Sheets

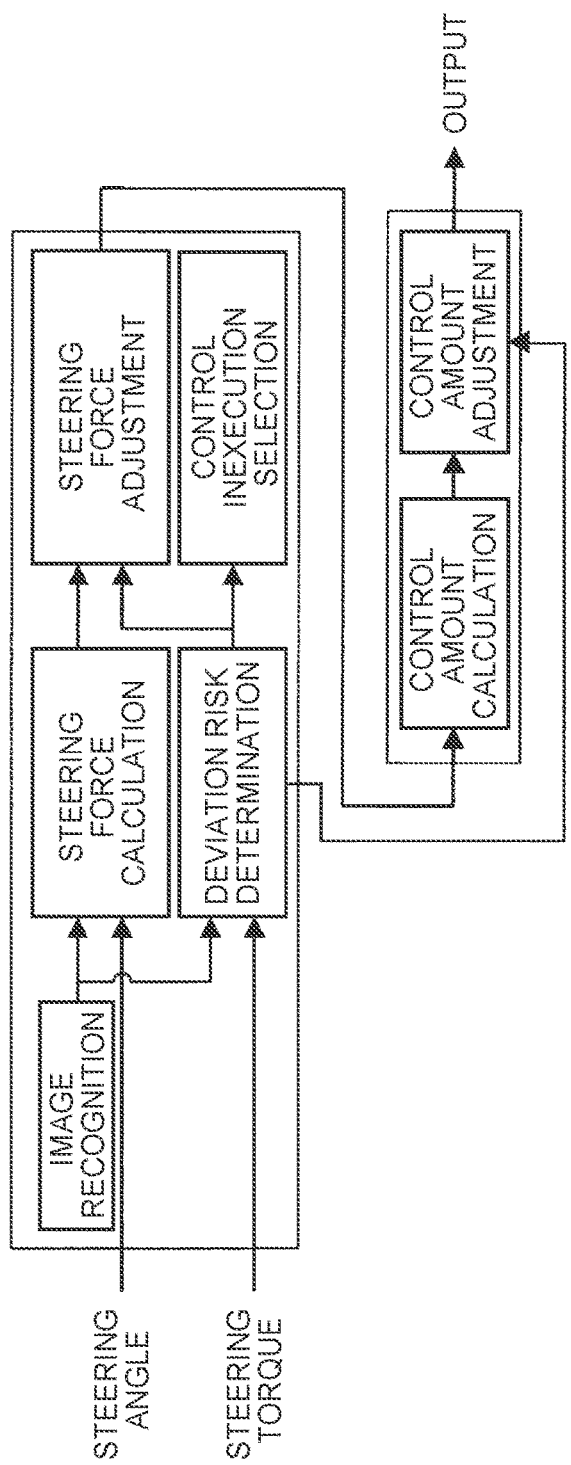
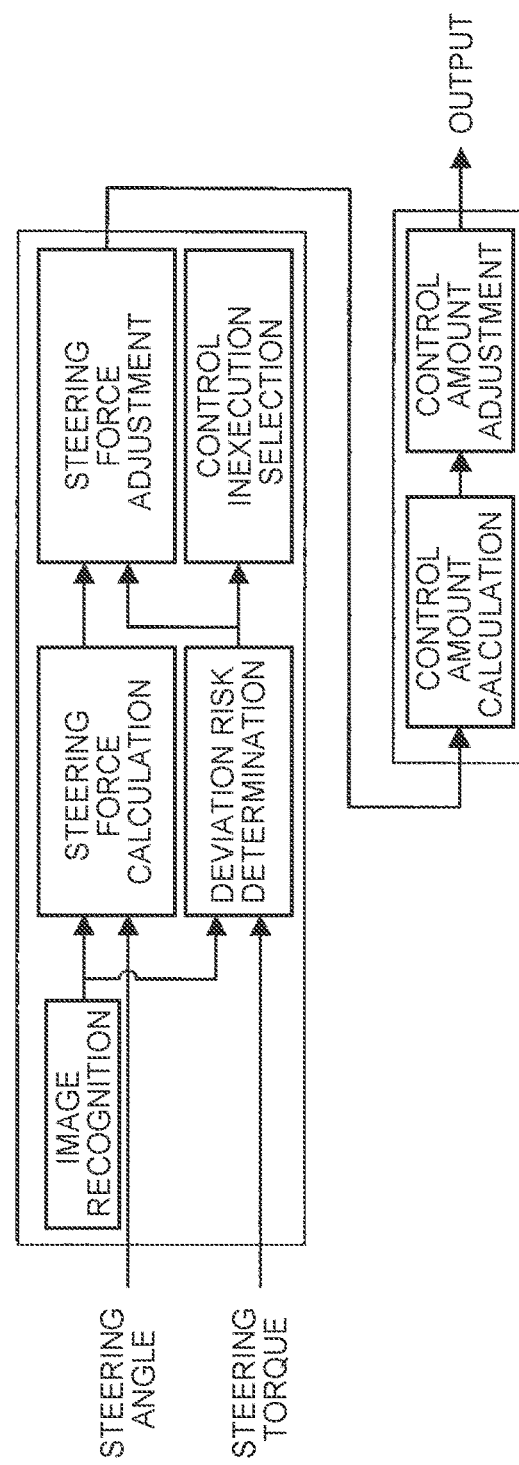
FIG. 9A
FIG. 9B

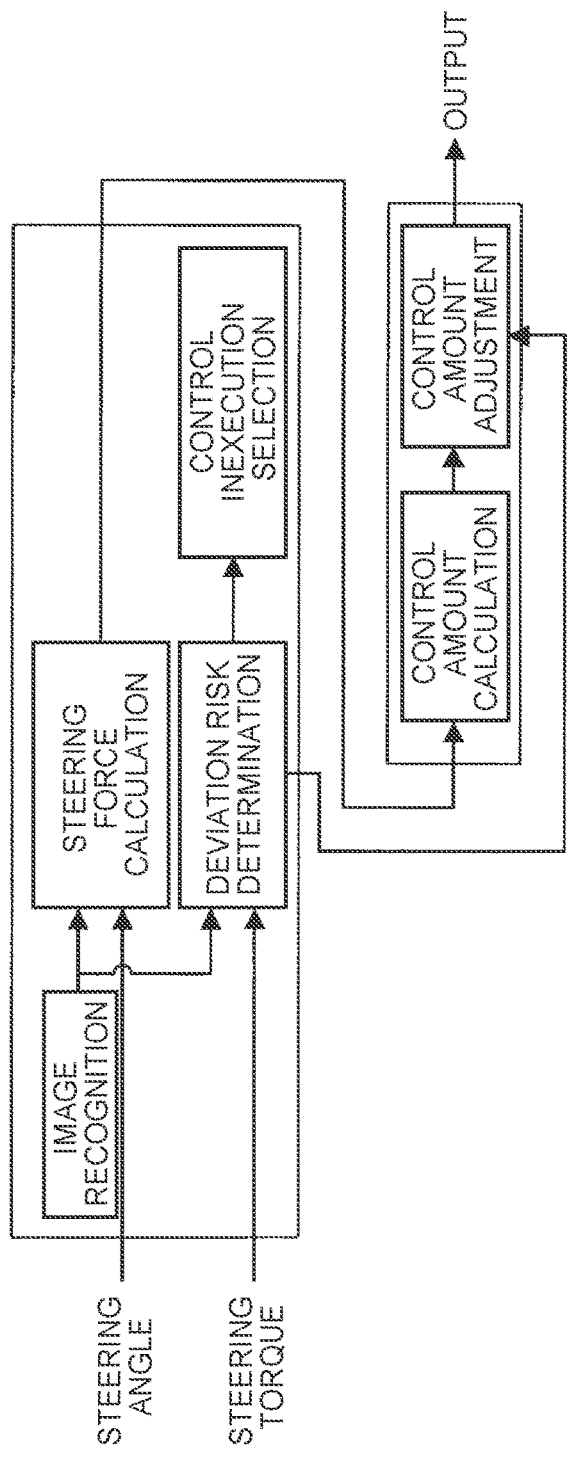
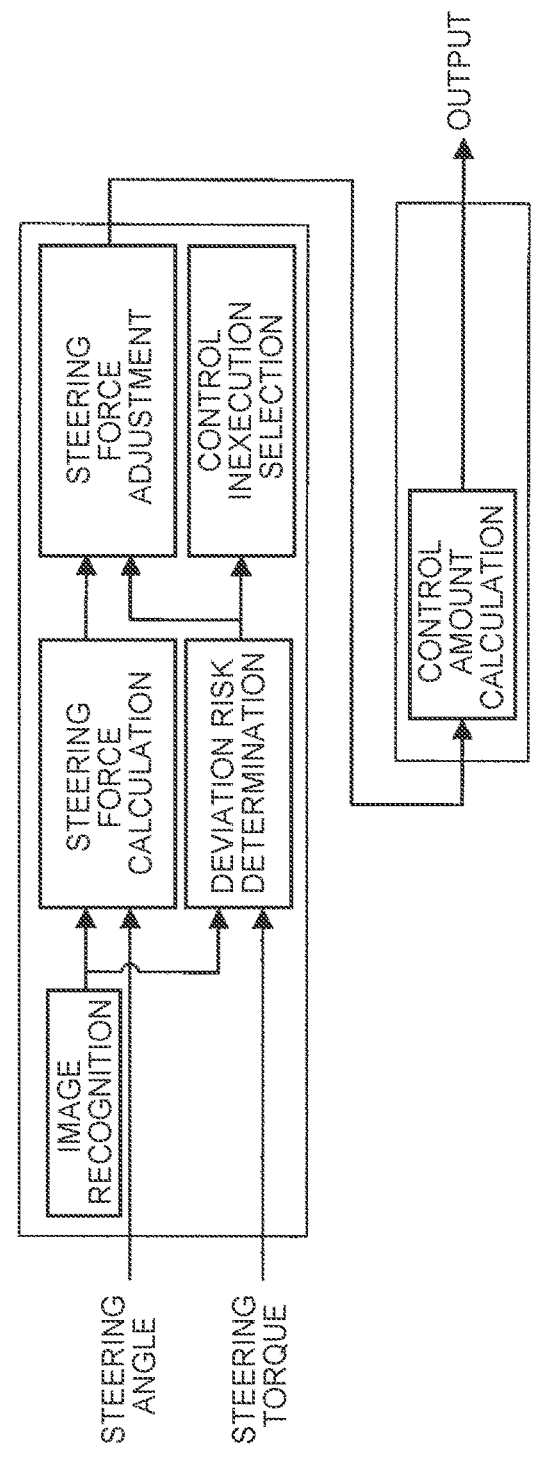
FIG. 10A
FIG. 10B

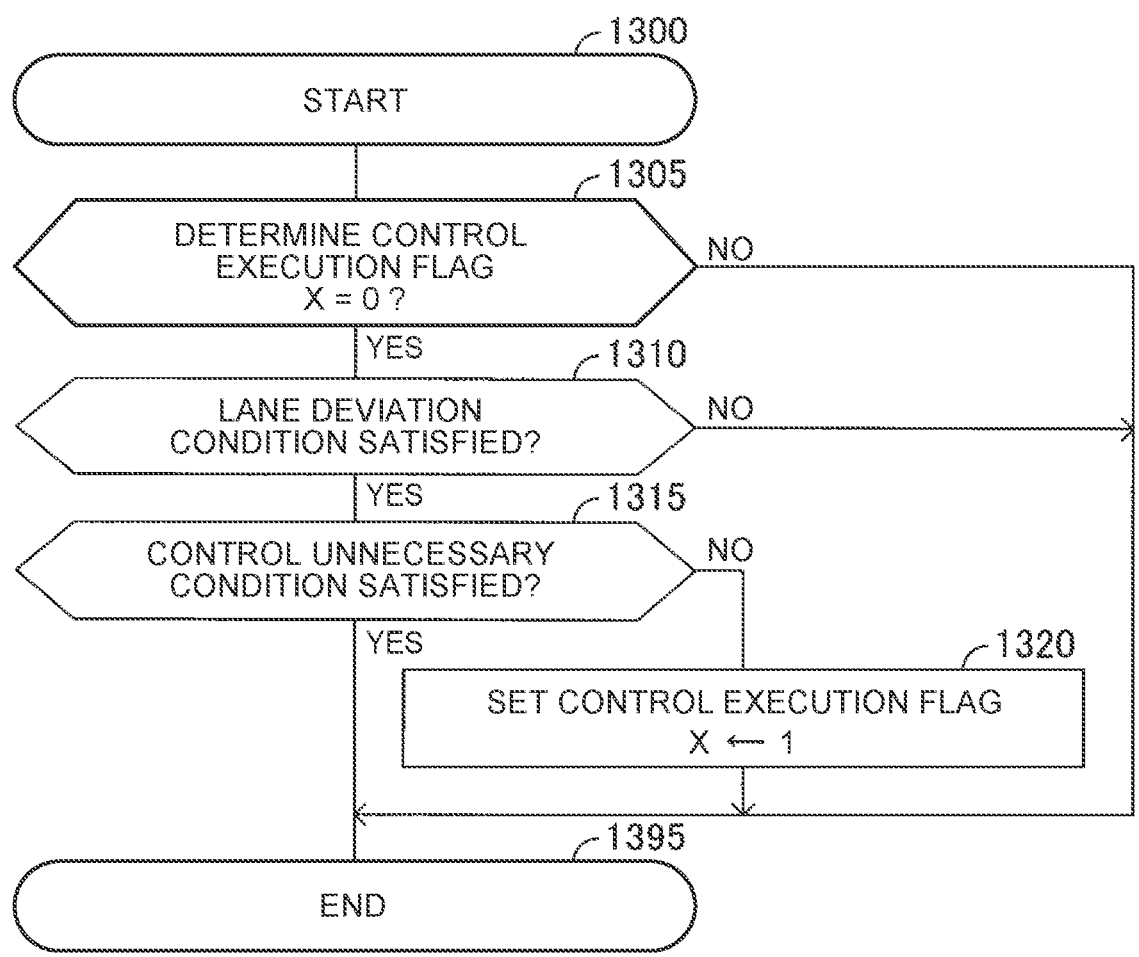

VEHICLE DRIVING SUPPORT DEVICE

CROSS-REFERENCE TO RELATED APPLICATION

This application claims priority to Japanese Patent Application No. 2021-175777 filed on Oct. 27, 2021, incorporated herein by reference in its entirety.

BACKGROUND

1. Technical Field

The present disclosure relates to a vehicle driving support device.

2. Description of Related Art

There is known a vehicle driving support device that provides driving support such as lane deviation suppression control in which an own vehicle is autonomously steered to suppress the own vehicle from deviating from a lane and lane keeping control in which the own vehicle is autonomously steered to cause the own vehicle to travel in the center of the lane.

During execution of the lane keeping control, the driver may intentionally input a steering operation force to the own vehicle in order to cause the own vehicle to travel out of the center of the lane, and in this case, the lane keeping control is desirably stopped. Thus, there is known a vehicle driving support device configured to stop the lane keeping control when the driver inputs a steering operation force equal to or larger than a predetermined cancellation threshold value to the own vehicle during the execution of the lane keeping control.

Whether it is desirable to stop the lane keeping control when the driver inputs the operation steering force to the own vehicle depends on the traveling condition of the own vehicle. Thus, there is known a vehicle driving support device configured to change the cancellation threshold value in accordance with the traveling condition of the own vehicle. More specifically, there is known a vehicle driving support device configured to change the cancellation threshold value in accordance with the traveling condition of the own vehicle such as whether the road on which the own vehicle is traveling is a straight road or a curved road, and whether the steering operation force in the left direction or the right direction is input from the driver to the own vehicle when the own vehicle is traveling on a curved road.

This vehicle driving support device is configured to stop the lane keeping control during the execution of the lane keeping control when the driver inputs a steering operation force equal to or larger than the cancellation threshold value set to the reference value to the own vehicle while the own vehicle is traveling on a straight road, when the driver inputs a steering operation force equal to or larger than a cancellation threshold value set to be smaller than the reference value in a direction of causing the own vehicle to travel along a curved road while the own vehicle is traveling on the curved road, and when the driver inputs a steering operation force equal to or larger than a cancellation threshold value set to be larger than the reference value in a direction opposite to the direction of causing the own vehicle to travel along a curved road while the own vehicle is traveling on the curved road (see, for example, WO 2020-230301).

SUMMARY

Also for the lane deviation suppression control, as described above, it is preferable to determine the necessity of executing the lane deviation suppression control and change the steering force autonomously applied to the own vehicle by the lane deviation suppression control (intervention steering force) in accordance with the traveling condition of the own vehicle.

However, since the lane deviation suppression control is control for suppressing the own vehicle from deviating from the lane, it is desirable to determine the necessity of executing the lane deviation suppression control and change the intervention steering force in consideration of the risk of deviation of the own vehicle from the lane when the lane deviation suppression control is not executed or the intervention steering force is changed.

An object of the present disclosure is to provide a vehicle driving support device capable of executing appropriate lane deviation suppression control in consideration of the risk of deviation of the own vehicle from the lane.

A vehicle driving support device according to the present disclosure includes a control device that executes lane deviation suppression control in which an own vehicle is autonomously steered to suppress the own vehicle from deviating from a lane. The control device sets a target steering force based on an intervention steering force and a driver-required steering force during execution of the lane deviation suppression control. The intervention steering force is a force autonomously set as a steering force for returning the own vehicle to the lane. The driver-required steering force is a force set based on a steering operation force input to the own vehicle by a driver of the own vehicle. The control device also applies a steering force corresponding to the target steering force to the own vehicle to autonomously steer the own vehicle.

The control device starts the lane deviation suppression control, sets a steering force of a reference value larger than zero as the intervention steering force to set the target steering force, and executes the lane deviation suppression control, when a straight lane deviation condition or a curve inner lane deviation condition is satisfied while a pre-intervention in-phase condition is not satisfied. The straight lane deviation condition is a condition that there is a possibility that the own vehicle deviates from the lane while traveling on a straight road. The curve inner lane deviation condition is a condition that there is a possibility that the own vehicle deviates from the lane from an inside of a curved road while traveling on the curved road. The pre-intervention in-phase condition is a condition that an in-phase steering operation force is being input to the own vehicle by the driver of the own vehicle. The in-phase steering operation force is a steering operation force that is equal to or larger than a predetermined value larger than zero and that is applied in a direction of returning the own vehicle that has deviated from the lane to the lane. On the other hand, the control device does not execute the lane deviation suppression control when the straight lane deviation condition or the curve inner lane deviation condition is satisfied while the pre-intervention in-phase condition is satisfied, or starts the lane deviation suppression control, sets a steering force smaller than the reference value as the intervention steering force to set the target steering force, and executes the lane deviation suppression control.

Alternatively, the control device sets a steering force smaller than the reference value as the intervention steering force to set the target steering force and execute the lane deviation suppression control, when a post-intervention in-phase condition is satisfied during an avoidance control period. The post-intervention in-phase condition is a condition that the in-phase steering operation force larger than a predetermined value is input to the own vehicle by the driver. The avoidance control period is a period from when the straight lane deviation condition or the curve inner lane deviation condition is satisfied and the lane deviation suppression control is started until the own vehicle is returned to the lane by the lane deviation suppression control.

Alternatively, the control device sets a steering force smaller than the reference value as the intervention steering force to set the target steering force and executes the lane deviation suppression control, when a post-intervention steering condition is satisfied during a return control period. The post-intervention steering condition is a condition that a steering operation force larger than a predetermined value is input to the own vehicle by the driver. The return control period is a period from when the own vehicle is returned to the lane by the lane deviation suppression control until the lane deviation suppression control is terminated after the straight lane deviation condition or the curve inner lane deviation condition is satisfied and the lane deviation suppression control is started.

When the straight lane deviation condition or the curve inner lane deviation condition is satisfied while the pre-intervention in-phase condition is satisfied, it is presumed that the driver is attempting to return the own vehicle to the lane himself/herself, and thus the deviation risk (the possibility that the own vehicle deviates from the lane to an extent equal to or more than the allowable extent) is small even if the lane deviation suppression control is not executed. When the lane deviation suppression control is executed, even if the intervention steering force is small, the deviation risk is small. According to the present disclosure, in this case, the lane deviation suppression control is not executed, or the lane deviation suppression control is executed with the steering force smaller than the reference value as the intervention steering force.

Further, when the post-intervention in-phase condition is satisfied during the avoidance control period after the straight lane deviation condition or the curve inner lane deviation condition is satisfied and the lane deviation suppression control is started, it is presumed that the driver is attempting to return the own vehicle to the lane himself/herself, and thus the deviation risk is small even if the intervention steering force is small. According to the present disclosure, in this case, the lane deviation suppression control is executed with a steering force smaller than the reference value as the intervention steering force.

Further, when the post-intervention steering condition is satisfied during the return control period after the straight lane deviation condition or the curve inner lane deviation condition is satisfied and the lane deviation suppression control is started, it is presumed that the driver is attempting to cause the own vehicle to travel in the lane regardless of whether the steering operation force input to the own vehicle by the driver is the in-phase steering operation force or the reverse-phase steering operation force (the steering operation force in the direction of causing the own vehicle to deviate from the lane). Thus, the deviation risk is small even if the intervention steering force is small. According to the present disclosure, in this case, the lane deviation suppression control is executed with a steering force smaller than the reference value as the intervention steering force.

From the above, according to the present disclosure, it is possible to execute appropriate lane deviation suppression control in consideration of the deviation risk.

In the vehicle driving support device according to the present disclosure, the control device may be configured to start the lane deviation suppression control, set the steering force of the reference value as the intervention steering force to set the target steering force, and execute the lane deviation suppression control, when a curve outer lane deviation condition is satisfied while the pre-intervention in-phase condition is not satisfied. The curve outer lane deviation condition is a condition that there is a possibility that the own vehicle deviates from the lane from an outside of a curved road while traveling on the curved road. In this case, the control device may be configured to set a steering force larger than the reference value as the intervention steering force to set the target steering force and execute the lane deviation suppression control, when the post-intervention in-phase condition is satisfied during the avoidance control period after the curve outer lane deviation condition is satisfied and the lane deviation suppression control is started.

When the post-intervention in-phase condition is satisfied during the avoidance control period after the curve outer lane deviation condition is satisfied and the lane deviation suppression control is started, it is presumed that the driver is attempting to return the own vehicle to the lane himself/herself but the own vehicle has deviated from the lane, and thus the deviation risk is large. According to the present disclosure, in this case, the lane deviation suppression control is executed with a steering force larger than the reference value as the intervention steering force. This makes it possible to execute appropriate lane deviation suppression control in consideration of the deviation risk.

Further, a vehicle driving support device according to the present disclosure includes a control device that executes lane deviation suppression control in which an own vehicle is autonomously steered to suppress the own vehicle from deviating from a lane. The control device sets a target steering force based on an intervention steering force and a driver-required steering force during execution of the lane deviation suppression control. The intervention steering force is a force autonomously set as a steering force for returning the own vehicle to the lane. The driver-required steering force is a force set based on a steering operation force input to the own vehicle by a driver of the own vehicle. The control device also applies a steering force corresponding to the target steering force to the own vehicle to autonomously steer the own vehicle.

The control device starts the lane deviation suppression control, sets a steering force of a reference value larger than zero as the intervention steering force to set the target steering force, and executes the lane deviation suppression control, when a straight lane deviation condition, a curve inner lane deviation condition, or a curve outer lane deviation condition is satisfied while a pre-intervention in-phase condition is not satisfied. The straight lane deviation condition is a condition that there is a possibility that the own vehicle deviates from the lane while traveling on a straight road. The curve inner lane deviation condition is a condition that there is a possibility that the own vehicle deviates from the lane from an inside of a curved road while traveling on the curved road. The curve outer lane deviation condition is a condition that there is a possibility that the own vehicle deviates from the lane from an outside of a curved road while traveling on the curved road. The pre-intervention in-phase condition is a condition that an in-phase steering operation force is being input to the own vehicle by the driver of the own vehicle. The in-phase steering operation force is a steering operation force that is equal to or larger than a predetermined value larger than zero and that is applied in a direction of returning the own vehicle that has deviated from the lane to the lane. On the other hand, the control device does not execute the lane deviation suppression control when the straight lane deviation condition, the curve inner lane deviation condition, or the curve outer lane deviation condition is satisfied while the pre-intervention in-phase condition is satisfied, or starts the lane deviation suppression control, sets a steering force smaller than the reference value as the intervention steering force to set the target steering force, and executes the lane deviation suppression control.

The predetermined value used for determining the pre-intervention in-phase condition when the straight lane deviation condition or the curve inner lane deviation condition is satisfied is set to a value smaller than the predetermined value used for determining the pre-intervention in-phase condition when the curve outer lane deviation condition is satisfied.

When the straight lane deviation condition or the curve inner lane deviation condition is satisfied while the in-phase steering operation force is being input to the own vehicle, it is presumed that the driver is attempting to return the own vehicle to the lane himself/herself, and thus the deviation risk is small. However, when the curve outer lane deviation condition is satisfied while the in-phase steering operation force is being input to the own vehicle, it is presumed that the driver is attempting to return the own vehicle to the lane himself/herself but the own vehicle has deviated from the lane, and thus the deviation risk is large. According to the present disclosure, the predetermined value used for determining the pre-intervention in-phase condition when the straight lane deviation condition or the curve inner lane deviation condition is satisfied is set to a value smaller than the predetermined value used for determining the pre-intervention in-phase condition when the curve outer lane deviation condition is satisfied. In other words, when the deviation risk is small, the lane deviation suppression control is likely to be executed or the intervention steering force is likely to be small, and when the deviation risk is large, the lane deviation suppression control is less likely to be executed or the intervention steering force is less likely to be small. This makes it possible to execute appropriate lane deviation suppression control in consideration of the deviation risk.

Further, a vehicle driving support device according to the present disclosure includes a control device that executes lane deviation suppression control in which an own vehicle is autonomously steered to suppress the own vehicle from deviating from a lane. The control device sets a target steering force based on an intervention steering force and a driver-required steering force during execution of the lane deviation suppression control. The intervention steering force is a force autonomously set as a steering force for returning the own vehicle to the lane. The driver-required steering force is a force set based on a steering operation force input to the own vehicle by a driver of the own vehicle. The control device also applies a steering force corresponding to the target steering force to the own vehicle to autonomously steer the own vehicle.

The control device sets a steering force of a reference value larger than zero as the intervention steering force to set the target steering force and executes the lane deviation suppression control, when a pre-intervention in-phase condition is not satisfied during an avoidance control period. The pre-intervention in-phase condition is a condition that an in-phase steering operation force is being input to the own vehicle by the driver of the own vehicle. The in-phase steering operation force is a steering operation force that is equal to or larger than a predetermined value larger than zero and that is applied in a direction of returning the own vehicle that has deviated from the lane to the lane. The avoidance control period is a period from when a straight lane deviation condition, a curve inner lane deviation condition, or a curve outer lane deviation condition is satisfied and the lane deviation suppression control is started until when the own vehicle is returned to the lane by the lane deviation suppression control. The straight lane deviation condition is a condition that there is a possibility that the own vehicle deviates from the lane while traveling on a straight road. The curve inner lane deviation condition is a condition that there is a possibility that the own vehicle deviates from the lane from an inside of a curved road while traveling on the curved road. The curve outer lane deviation condition is a condition that there is a possibility that the own vehicle deviates from the lane from an outside of a curved road while traveling on the curved road. On the other hand, the control device sets a steering force smaller than the reference value as the intervention steering force to set the target steering force and execute the lane deviation suppression control, when the pre-intervention in-phase condition is satisfied during the avoidance control period after the straight lane deviation condition or the curve inner lane deviation condition is satisfied and the lane deviation suppression control is started. The control device also sets a steering force larger than the reference value as the intervention steering force to set the target steering force and execute the lane deviation suppression control, when the pre-intervention in-phase condition is satisfied during the avoidance control period after the curve outer lane deviation condition is satisfied and the lane deviation suppression control is started.

When the pre-intervention in-phase condition is satisfied during the avoidance control period after the straight lane deviation condition or the curve inner lane deviation condition is satisfied and the lane deviation suppression control is started, it is presumed that the driver is attempting to return the own vehicle to the lane himself/herself, and thus the deviation risk is small even if the steering force autonomously applied to the own vehicle is small. According to the present disclosure, in this case, the lane deviation suppression control is executed with a steering force smaller than the reference value as the intervention steering force. This makes it possible to execute appropriate lane deviation suppression control in consideration of the deviation risk. On the other hand, when the pre-intervention in-phase condition is satisfied during the avoidance control period after the curve outer lane deviation condition is satisfied and the lane deviation suppression control is started, it is presumed that the driver is attempting to return the own vehicle to the lane himself/herself but the own vehicle has deviated from the lane, and thus the deviation risk is large. According to the present disclosure, in this case, the lane deviation suppression control is executed with a steering force larger than the reference value as the intervention steering force. This makes it possible to execute appropriate lane deviation suppression control in consideration of the deviation risk.

The components of the present disclosure are not limited to the embodiment of the present disclosure described later with reference to the drawings. Other objects, other features, and accompanying advantages of the present disclosure will be readily understood from the description of the embodiment of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9A is a diagram showing an example of functions of the vehicle driving support device according to the embodiment of the present disclosure;

FIG. 9B is a diagram showing an example of functions of the vehicle driving support device according to the embodiment of the present disclosure;

Figure 11A:
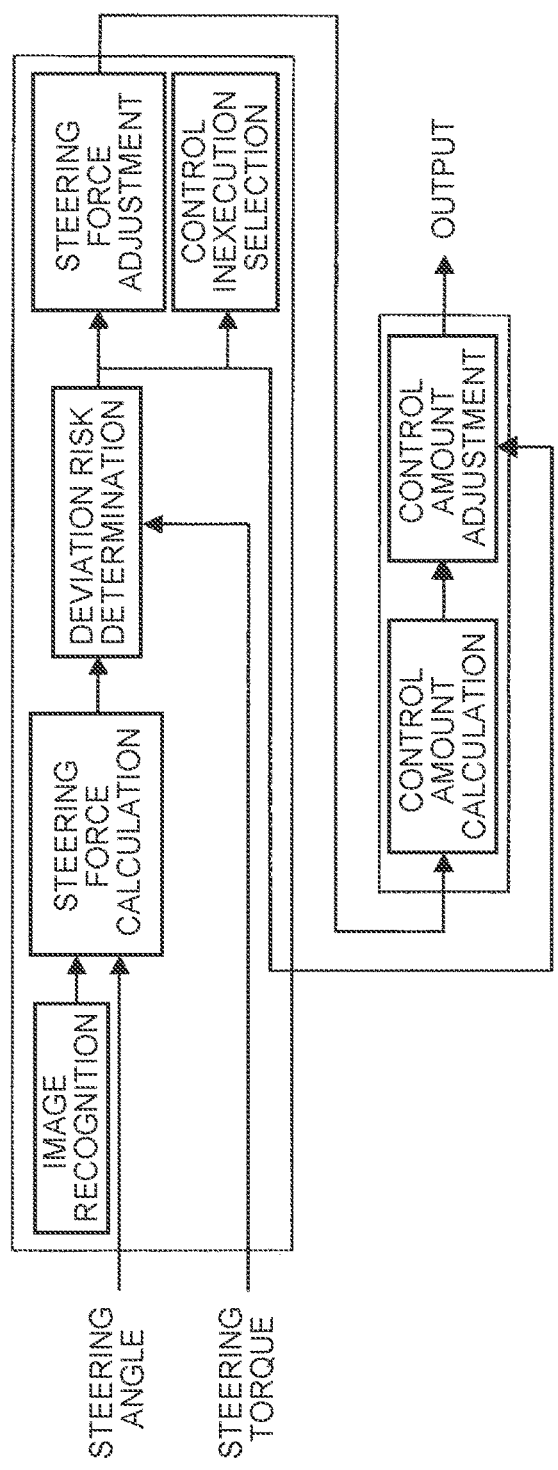
Figure 11B:
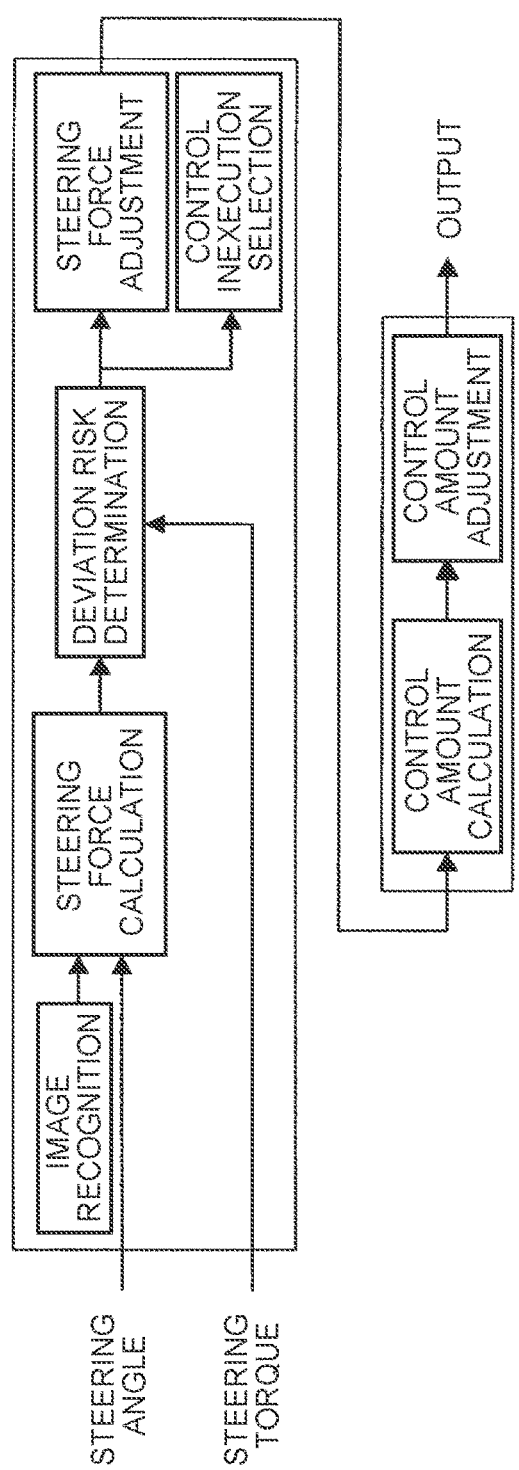
Figure 12A:
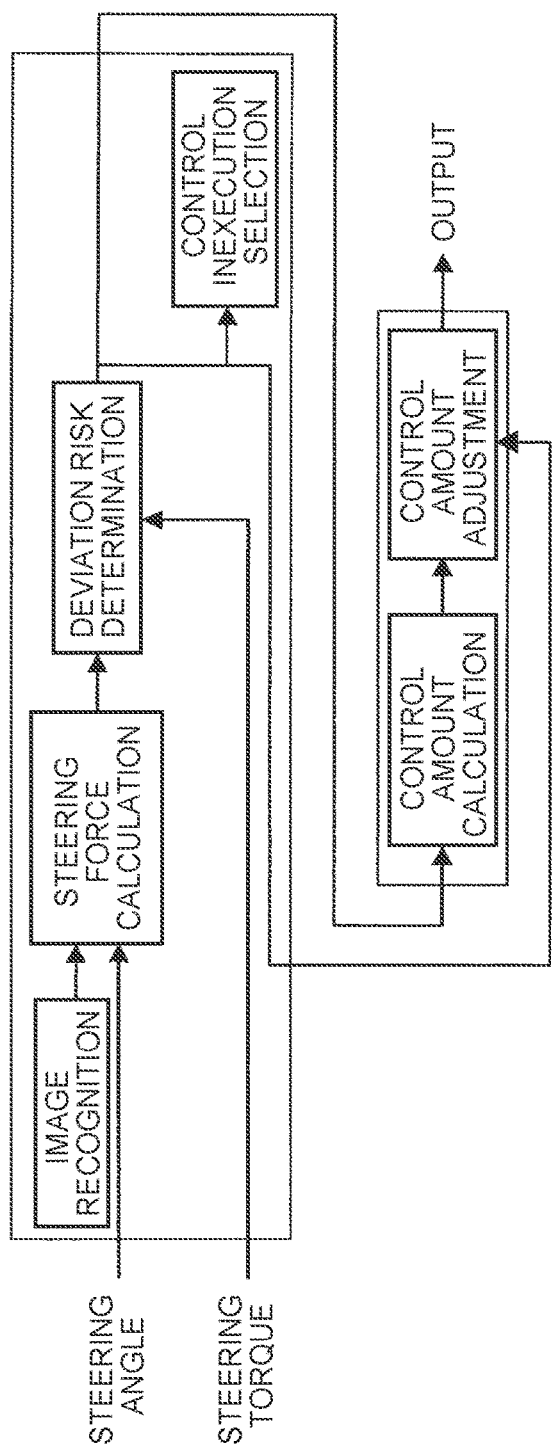
Figure 12B:
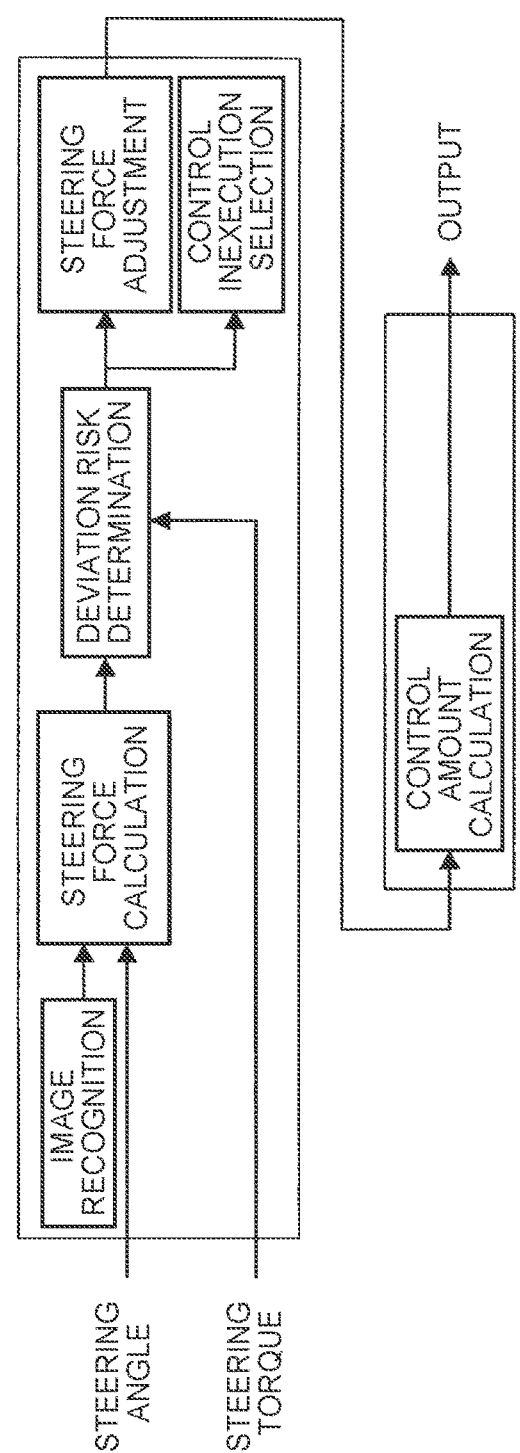
Figure 14:
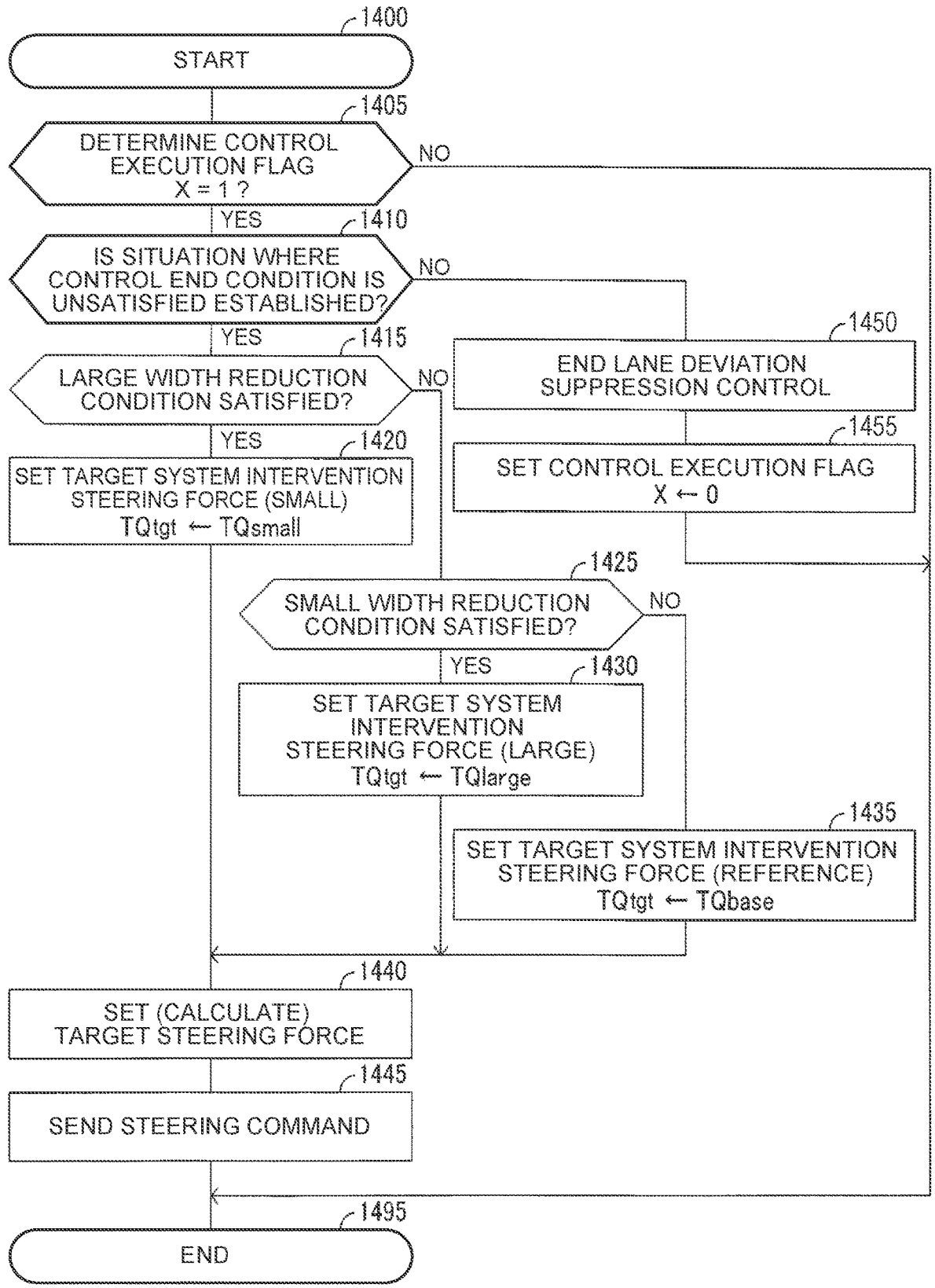

FIG. TOA is a diagram showing an example of functions of the vehicle driving support device according to the embodiment of the present disclosure;

FIG. 10B is a diagram showing an example of functions of the vehicle driving support device according to the embodiment of the present disclosure;

FIG. 11A is a diagram showing an example of functions of the vehicle driving support device according to the embodiment of the present disclosure;

FIG. 11B is a diagram showing an example of functions of the vehicle driving support device according to the embodiment of the present disclosure;

FIG. 12A is a diagram showing an example of functions of the vehicle driving support device according to the embodiment of the present disclosure;

FIG. 12B is a diagram showing an example of functions of the vehicle driving support device according to the embodiment of the present disclosure;

FIG. 13 is a flowchart showing a routine executed by the vehicle driving support device according to the embodiment of the present disclosure; and FIG. 14 is a flowchart showing a routine executed by the vehicle driving support device according to the embodiment of the present disclosure.

DETAILED DESCRIPTION OF EMBODIMENTS

Figure 1:
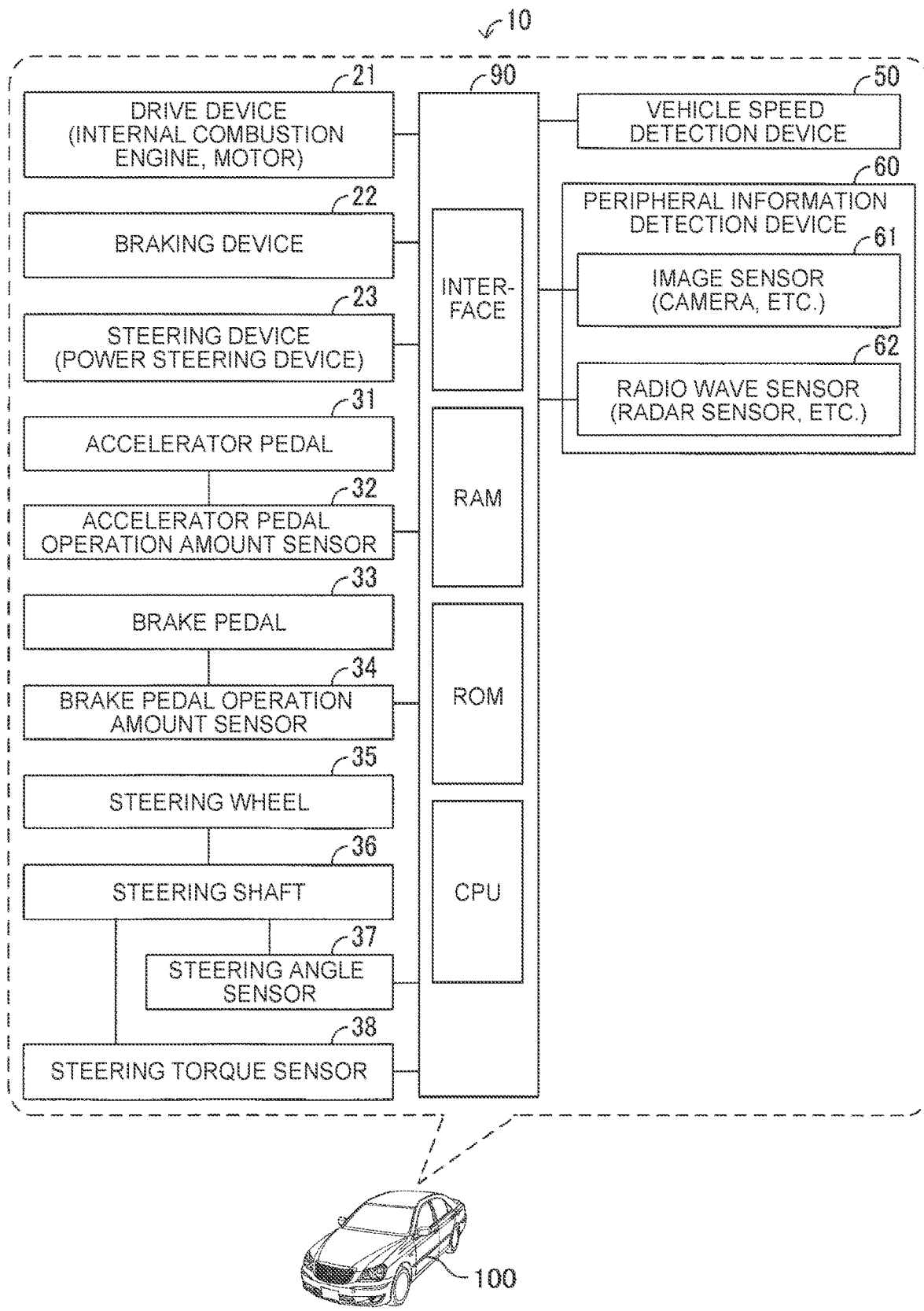
FIG. 1 is a diagram showing a vehicle driving support device according to an embodiment of the present disclosure and a vehicle (an own vehicle) on which the device is mounted.

Hereinafter, a vehicle driving support device according to an embodiment of the present disclosure will be described with reference to the drawings. As shown in FIG. 1, a vehicle driving support device 10 according to the embodiment of the present disclosure is mounted on a vehicle (own vehicle 100).

ECU

The vehicle driving support device 10 includes an ECU 90 as a control device. The term ECU is an abbreviation for electronic control unit. The ECU 90 includes a microcomputer as a main part. The microcomputer includes a central processing unit (CPU), a read-only memory (ROM), a random access memory (RAM), a non-volatile memory, an interface, and the like. The CPU realizes various functions by executing instructions, programs, or routines stored in the ROM.

Drive Device, Etc.

The own vehicle 100 is equipped with a drive device 21, a braking device 22, and a steering device 23.

Drive Device

The drive device 21 is a device that outputs a driving force (driving torque) applied to the own vehicle 100 in order to cause the own vehicle 100 to travel, and is, for example, an internal combustion engine, a motor, or the like. The drive device 21 is electrically connected to the ECU 90. The ECU 90 can control the driving force output from the drive device 21 by controlling the operation of the drive device 21.

Braking Device

The braking device 22 is a device that outputs a braking force (braking torque) applied to the own vehicle 100 in order to brake the own vehicle 100, and is, for example, a hydraulic brake device. The braking device 22 is electrically connected to the ECU 90. The ECU 90 can control the braking force output from the braking device 22 by controlling the operation of the braking device 22.

Steering Device

The steering device 23 is a device that outputs a steering force (steering torque) applied to the own vehicle 100 in order to steer the own vehicle 100, and is, for example, a power steering device. The steering device 23 is electrically connected to the ECU 90. The ECU 90 can control the steering force output from the steering device 23 by controlling the operation of the steering device 23.

Sensors, Etc.

An accelerator pedal 31, an accelerator pedal operation amount sensor 32, a brake pedal 33, a brake pedal operation amount sensor 34, a steering wheel 35, a steering shaft 36, a steering angle sensor 37, a steering torque sensor 38, a vehicle speed detection device 50, and a peripheral information detection device 60 are also mounted on the own vehicle 100.

Accelerator Pedal Operation Amount Sensor

The accelerator pedal operation amount sensor 32 is a sensor that detects the operation amount of the accelerator pedal 31. The accelerator pedal operation amount sensor 32 is electrically connected to the ECU 90. The accelerator pedal operation amount sensor 32 transmits information of the detected operation amount of the accelerator pedal 31 to the ECU 90. The ECU 90 acquires the operation amount of the accelerator pedal 31 (accelerator pedal operation amount AP) based on the information.

The ECU 90 acquires a required driving force (required driving torque) by calculation based on the accelerator pedal operation amount AP and the traveling speed (own vehicle speed) of the own vehicle 100. The required driving force is the driving force required to be output from the drive device 21. The ECU 90 controls the operation of the drive device 21 so that a driving force corresponding to the required driving force is output.

Brake Pedal Operation Amount Sensor

The brake pedal operation amount sensor 34 is a sensor that detects the operation amount of the brake pedal 33. The brake pedal operation amount sensor 34 is electrically connected to the ECU 90. The brake pedal operation amount sensor 34 transmits information of the detected operation amount of the brake pedal 33 to the ECU 90. The ECU 90 acquires the operation amount of the brake pedal 33 (brake pedal operation amount BP) based on the information.

The ECU 90 acquires the required braking force (required braking torque) by calculation based on the brake pedal operation amount BP. The required braking force is the braking force required to be output from the braking device 22. The ECU 90 controls the operation of the braking device 22 so that a braking force corresponding to the required braking force is output.

Steering Angle Sensor

The steering angle sensor 37 is a sensor that detects the rotation angle of the steering shaft 36 with respect to the neutral position. The steering angle sensor 37 is electrically connected to the ECU 90. The steering angle sensor 37 transmits information of the detected rotation angle of the steering shaft 36 to the ECU 90. The ECU 90 acquires the rotation angle of the steering shaft 36 (steering angle θs) based on the information.

Steering Torque Sensor

The steering torque sensor 38 is a sensor that detects the torque input to the own vehicle 100 by the driver of the own vehicle 100 (in this example, the torque input to the steering shaft 36 via the steering wheel 35). The steering torque sensor 38 is electrically connected to the ECU 90. The steering torque sensor 38 transmits information of the detected torque to the ECU 90. The ECU 90 acquires the torque (driver steering operation force TQ_D) input to the steering shaft 36 by the driver via the steering wheel 35 based on the information.

Vehicle Speed Detection Device

The vehicle speed detection device 50 is a device that detects the traveling speed of the own vehicle 100, and is, for example, a wheel speed sensor. The vehicle speed detection device 50 is electrically connected to the ECU 90. The vehicle speed detection device 50 transmits information of the detected traveling speed of the own vehicle 100 to the ECU 90. The ECU 90 acquires the traveling speed (own vehicle speed V) of the own vehicle 100 based on the information.

The ECU 90 acquires a driver-required steering force TQ_Dreq (required steering torque) by calculation based on the acquired steering angle θs, driver steering operation force TQ_D, and own vehicle speed V. The driver-required steering force TQ_Dreq is a steering force required to be output from the steering device 23. Except when executing the lane deviation suppression control described later, the ECU 90 sets the driver-required steering force TQ_Dreq as the target steering force TQtgt and performs normal steering control to control the operation of the steering device 23 so that a steering force corresponding to the target steering force TQtgt is output from the steering device 23.

Peripheral Information Detection Device

The peripheral information detection device 60 is a device that detects information of the periphery of the own vehicle 100, and in this example, includes an image sensor 61 and a radio wave sensor 62. The image sensor 61 is, for example, a camera. The radio wave sensor 62 is, for example, a radar sensor (millimeter wave radar or the like). The peripheral information detection device 60 may include a sound wave sensor such as an ultrasonic sensor (clearance sonar) or an optical sensor such as a laser radar (LiDAR).

Image Sensor

The image sensor 61 is electrically connected to the ECU 90. The image sensor 61 captures an image of the periphery of the own vehicle 100 and transmits information of the captured image to the ECU 90. The ECU 90 can acquire information (peripheral detection information IS) about the periphery of the own vehicle 100 based on the information (image information II).

Radio Wave Sensor

The radio wave sensor 62 is electrically connected to the ECU 90. The radio wave sensor 62 transmits radio waves and receives radio waves (reflected waves) reflected by an object. The radio wave sensor 62 transmits information related to the transmitted radio waves and the received radio waves (reflected waves) to the ECU 90. In other words, the radio wave sensor 62 detects an object existing in the periphery of the own vehicle 100 and transmits information related to the detected object to the ECU 90. The ECU 90 can acquire information (peripheral detection information IS) related to the object such as a structure existing in the periphery of the own vehicle 100 based on the information (radio wave information).

Outline of Operation of Vehicle Driving Support Device

Next, the outline of the operation of the vehicle driving support device 10 will be described. When a lane deviation condition indicating that the own vehicle 100 may deviate from the current lane LN (the lane in which the own vehicle 100 is traveling) is satisfied while the own vehicle 100 is traveling, the vehicle driving support device 10 executes the lane deviation suppression control for suppressing the own vehicle 100 from deviating from the current lane LN by autonomously steering the own vehicle 100 as shown in FIG. 2, unless a control unnecessary condition described later is satisfied.

While the own vehicle 100 is traveling, the vehicle driving support device 10 determines that the lane deviation condition is satisfied when the own vehicle 100 reaches the left side deviation determination line LL, and determines that the lane deviation condition is satisfied when the own vehicle 100 reaches the right side deviation determination line LR. More specifically, while the own vehicle 100 is traveling, the vehicle driving support device 10 determines that the lane deviation condition is satisfied when the left side distance DL becomes zero or determines that the lane deviation condition is satisfied when the right side distance DR becomes zero.

Figure 2:
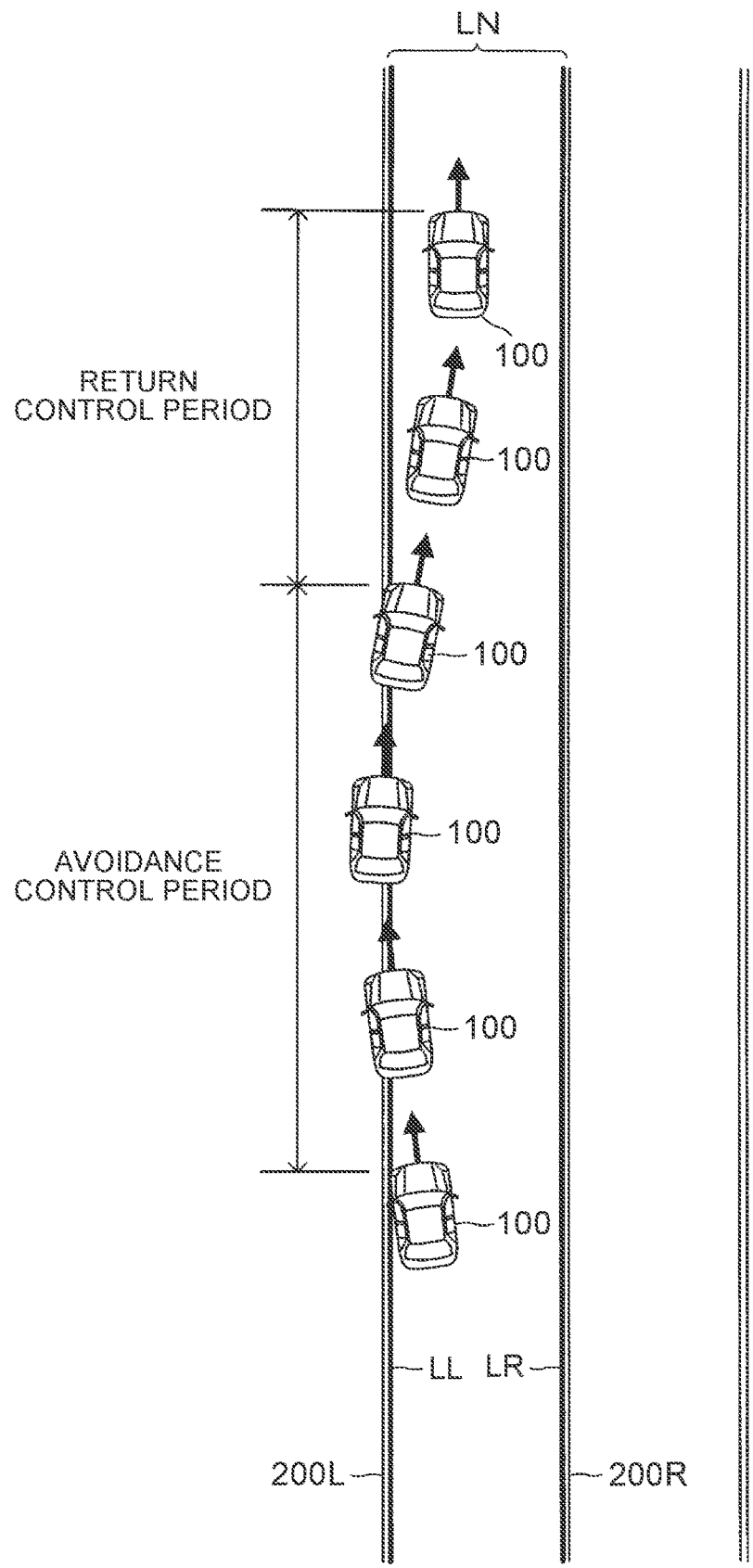
FIG. 2 is a diagram showing a situation in which the own vehicle traveling on a straight road deviates from a lane from the left side.

The left side deviation determination line LL is a line extending along the left side end of the current lane LN (left side lane marking line 200L in the example shown in FIG. 2), and the right side deviation determination line LR is a line extending along the right side end of the current lane LN (right side lane marking line 200R in the example shown in FIG. 2). The vehicle driving support device 10 acquires the left side lane marking line 200L and the right side lane marking line 200R based on the peripheral detection information IS.

Figure 3:
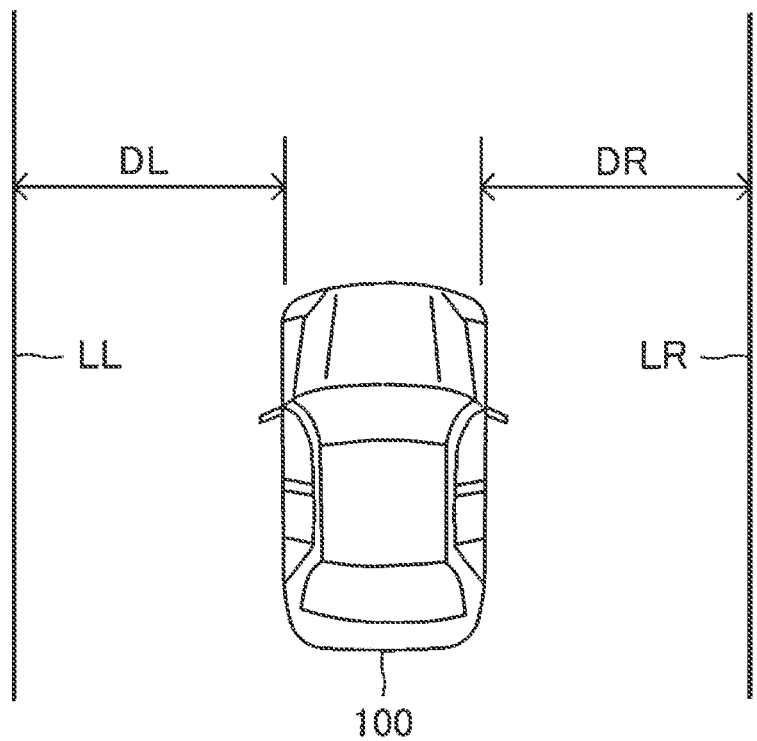
FIG. 3 is a diagram showing a left-side distance and a right-side distance.

As shown in FIG. 3, the left side distance DL is the distance between the left front end portion of the own vehicle 100 and the left side deviation determination line LL, and the right side distance DR is the distance between the right front end portion of the own vehicle 100 and the right side deviation determination line LR.

Here, when the lane deviation suppression control is executed, it is preferable to determine the necessity of executing the lane deviation suppression control and change the steering force (system intervention steering force) autonomously set as a steering force for returning the own vehicle 100 to the current lane LN by the lane deviation suppression control, in accordance with the traveling condition of the own vehicle 100 such as whether the own vehicle 100 is traveling on a straight road or a curved road and the level of steering operation force the driver applies to the own vehicle 100.

However, since the lane deviation suppression control is control for suppressing the own vehicle 100 from deviating from the current lane LN, it is desirable to determine the necessity of executing the lane deviation suppression control and change the system intervention steering force in consideration of the risk of deviation of the own vehicle 100 from the current lane LN when the lane deviation suppression control is not executed or the system intervention steering force is changed.

Therefore, the vehicle driving support device 10 executes the lane deviation suppression control as follows.

In this example, three threshold values, a first threshold value TQ1, a second threshold value TQ2, and a third threshold value TQ3, are prepared as threshold values (control unnecessary determination threshold values) related to the driver steering operation force TQ_D for determining whether execution of the lane deviation suppression control is unnecessary (that is, whether the control unnecessary condition is satisfied). The first threshold value TQ1 is set to a value larger than zero and is the smallest value of the three threshold values, the second threshold value TQ2 is set to a value larger than the first threshold value TQ1, and the third threshold value TQ3 is set to a value larger than the second threshold value TQ2, and therefore is the largest value among the three threshold values.

Left Side Deviation While Traveling on Straight Road Before Start of Lane Deviation Suppression Control As shown in FIG. 2, when the own vehicle 100 reaches the left side deviation determination line LL while traveling on a straight road (that is, when the left side distance DL becomes zero), the vehicle driving support device 10 determines whether a driver steering operation force TQ_D of the same phase (in-phase steering operation force) that is equal to or larger than the first threshold value TQ1 or a driver steering operation force TQ_D of the reverse phase (reverse-phase steering operation force) that is equal to or larger than the second threshold value TQ2 is detected (input to the own vehicle 100).

In other words, the vehicle driving support device 10 determines whether "a control unnecessary condition that the straight lane deviation condition is satisfied while the pre-intervention in-phase condition is satisfied" is satisfied and whether "a control unnecessary condition that the straight lane deviation condition is satisfied while the pre-intervention reverse-phase condition is satisfied" is satisfied.

The straight lane deviation condition here is a condition that the own vehicle 100 has reached the left side deviation determination line LL while traveling on a straight road. The pre-intervention in-phase condition used when the straight lane deviation condition is satisfied is a condition that the driver steering operation force TQ_D of the same phase that is equal to or larger than the first threshold value TQ1 is detected (input to the own vehicle 100). The pre-intervention reverse-phase condition used when the straight lane deviation condition is satisfied is a condition that a driver steering operation force TQ_D of the reverse phase that is equal to or larger than the second threshold value TQ2 is detected (input to the own vehicle 100).

The driver steering operation force TQ_D of the same phase (in-phase steering operation force) is the driver steering operation force TQ_D that is applied in the direction of returning the own vehicle 100 that has deviated from the current lane LN to the current lane LN (deviation avoidance direction), and is the driver steering operation force TQ_D in the right (i.e., clockwise) direction in the situation shown in FIG. 2. In contrast, the driver steering operation force TQ_D of the reverse phase (reverse-phase steering operation force) is the driver steering operation force TQ_D that is applied in the direction of causing the own vehicle 100 to deviate from the current lane LN (deviation direction), and is the driver steering operation force TQ_D in the left (i.e., counterclockwise) direction in the situation shown in FIG. 2.

When the control unnecessary condition is satisfied, the vehicle driving support device 10 continues the normal steering control without executing the lane deviation suppression control. As described above, the normal steering control is control in which the required steering force is acquired by calculation based on the steering angle $\theta s$, the driver steering operation force TQ_D, and the own vehicle speed V, and a steering force corresponding to the required steering force is output from the steering device 23.

On the other hand, when the control unnecessary condition is not satisfied, the vehicle driving support device 10 starts the lane deviation suppression control. When the vehicle driving support device 10 starts the lane deviation suppression control, the vehicle driving support device 10 sets a target value of the system intervention steering force (target system intervention steering force TQ_Stgt), sets the target steering force TQtgt based on the target system intervention steering force TQ_Stgt and the driver-required steering force TQ_Dreq, and causes the steering device 23 to output a steering force corresponding to the target steering force TQtgt (applies a steering force corresponding to the target steering force TQtgt to the own vehicle 100).

Specifically, the vehicle driving support device 10 sets the reference value (reference steering force TQbase) as the target value of the system intervention steering force (target system intervention steering force TQ_Stgt) unless the following large width reduction condition and small width reduction condition are satisfied after the start of the lane deviation suppression control. When the direction of the driver-required steering force TQ_Dreq at that time is the same as the direction of the target system intervention steering force TQ_Stgt, the vehicle driving support device 10 sets the total value of the target system intervention steering force TQ_Stgt and the driver-required steering force TQ_Dreq as the target steering force TQtgt, and when the direction of the driver-required steering force TQ_Dreq at that time is different from the direction of the target system intervention steering force TQ_Stgt, the vehicle driving support device 10 sets the value obtained by subtracting the driver-required steering force TQ_Dreq from the target system intervention steering force TQ_Stgt as the target steering force TQtgt. The vehicle driving support device 10 then causes the steering device 23 to output a steering force corresponding to the target steering force TQtgt (applies a steering force corresponding to the target steering force TQtgt to the own vehicle 100).

The reference steering force TQbase is a steering force required to be applied to the own vehicle 100 in order to cause the own vehicle 100 to travel along the predetermined route and to return to the current lane LN in consideration of the steering angle $\theta s$, the own vehicle speed V, the determination line intersection angle $\theta L$ when the driver steering operation force TQ_D is zero. The reference steering force TQbase is acquired by, for example, an arithmetic expression using the steering angle $\theta s$, the own vehicle speed V, the determination line intersection angle $\theta L$, or the like as parameters, or is acquired by applying the steering angle $\theta s$, the own vehicle speed V, the determination line intersection angle θL, or the like to a lookup table (map) prepared in advance.

The determination line intersection angle θL is an angle defined by the longitudinal center line of the own vehicle 100 (a line extending in the front-rear direction through the center in the width direction of the own vehicle 100) and the left side deviation determination line LL. When the own vehicle 100 faces the right side deviation determination line LR, the determination line intersection angle θL is an angle defined by the longitudinal center line of the own vehicle 100 and the right side deviation determination line LR.

As described above, when the driver is operating the steering wheel 35 in the direction of returning the own vehicle 100 to the current lane LN in the case where the own vehicle 100 traveling on a straight road may deviate from the left side of the current lane LN (in the case where the straight lane deviation condition is satisfied), it is presumed that the driver is operating the steering wheel 35 himself/herself in an attempt to return the own vehicle 100 to the current lane LN, and thus the deviation risk (the possibility that the own vehicle 100 deviates from the current lane LN to an extent equal to or more than the allowable extent) is small. Therefore, the vehicle driving support device 10 does not execute the lane deviation suppression control even when the driver steering operation force TQ_D at that time is relatively small (that is, when the driver steering operation force TQ_D at that time is equal to or larger than the first threshold value TQ1).

On the other hand, when the driver is operating the steering wheel 35 in the direction of causing the own vehicle 100 to deviate from the current lane LN in the case where the own vehicle 100 traveling on a straight road may deviate from the left side of the current lane LN (in the case where the straight lane deviation condition is satisfied), the deviation risk is large, so that the vehicle driving support device 10 basically executes the lane deviation suppression control. However, when the driver steering operation force TQ_D at that time is relatively large (that is, when the driver steering operation force TQ_D at that time is equal to or larger than the second threshold value TQ2), it is presumed that the driver is intentionally attempting to cause the own vehicle 100 to deviate from the current lane LN, so that the vehicle driving support device 10 does not execute the lane deviation suppression control.

After Start of Lane Deviation Suppression Control

When the vehicle driving support device 10 starts the lane deviation suppression control, the vehicle driving support device 10 monitors the driver steering operation force TQ_D during the execution of the lane deviation suppression control.

The vehicle driving support device 10 determines whether a driver steering operation force TQ_D of the same phase or a driver steering operation force TQ_D of the reverse phase that is larger than a predetermined value (in this example, zero) is detected (input to the own vehicle 100) in a period (avoidance control period) from the start of the lane deviation suppression control until the right and left front wheels of the own vehicle 100 are returned to the current lane LN.

In other words, the vehicle driving support device 10 determines whether "the large width reduction condition that the post-intervention in-phase condition is satisfied during the avoidance control period after the straight lane deviation condition is satisfied and the lane deviation suppression control is started" is satisfied, and whether "the small width reduction condition that the post-control start reverse-phase condition is satisfied during the avoidance control period after the straight lane deviation condition is satisfied and the lane deviation suppression control is started" is satisfied.

The post-intervention in-phase condition used during the avoidance control period after the own vehicle 100 reaches the left side deviation determination line LL, the straight lane deviation condition is satisfied, and the lane deviation suppression control is started is a condition that the driver steering operation force TQ_D of the same phase that is larger than a predetermined value (in this example, zero) is detected (input to the own vehicle 100).

The post-control start reverse-phase condition used during the avoidance control period after the own vehicle 100 reaches the left side deviation determination line LL, the straight lane deviation condition is satisfied, and the lane deviation suppression control is started is a condition that the driver steering operation force TQ_D of the reverse phase that is larger than a predetermined value (in this example, zero) is detected (input to the own vehicle 100).

When the large width reduction condition is satisfied, the vehicle driving support device 10 sets the value (small steering force TQsmall) obtained by subtracting a predetermined value (large width reduction value dTQlarge) from the reference steering force TQbase as the target value of the system intervention steering force (target system intervention steering force TQ_Stgt) (TQ_Stgt=TQbase−dTQsmall). The vehicle driving support device 10 then sets the total value of the target system intervention steering force TQ_Stgt and the driver-required steering force TQ_Dreq as the target steering force TQtgt, and causes the steering device 23 to output a steering force corresponding to the target steering force TQtgt (applies a steering force corresponding to the target steering force TQtgt to the own vehicle 100).

The steering force applied to the own vehicle 100 at this time is the steering force in the direction of returning the own vehicle 100 to the current lane LN, and in this example, is a steering force having a magnitude corresponding to the reference steering force TQbase. That is, in this example, the large width reduction value dTQlarge is set so that the target steering force TQtgt becomes a value that matches the reference steering force TQbase.

The large width reduction value dTQlarge is a value set in accordance with the driver steering operation force TQ_D, and in particular, is a value that increases as the driver steering operation force TQ_D increases. In this example, a lookup table (map) according to the deviation risk determined by "(1) whether the driver steering operation force TQ_D is the steering force of the same phase or the steering force of the reverse phase, (2) whether the road on which the own vehicle 100 is traveling is a straight road or a curved road, (3) whether the own vehicle 100 deviates from the current lane LN from the inside of a curved road or deviates from the current lane LN from the outside of a curved road when the road on which the own vehicle 100 is traveling is the curved road, and 4) whether the current timing is during the avoidance control period or the return control period described later" is prepared in advance, and the large width reduction value dTQlarge is acquired by applying the driver steering operation force TQ_D to the lookup table selected according to the deviation risk at that time.

On the other hand, when the small width reduction condition is satisfied, the vehicle driving support device 10 sets the value (large steering force TQlarge) obtained by subtracting a predetermined value (small width reduction value dTQsmall) smaller than the large width reduction value dTQlarge from the reference steering force TQbase as the target value of the system intervention steering force (target system intervention steering force TQ_Stgt) (TQ_Stgt=TQbase−dTQlarge). As described above, the target system intervention steering force TQ_Stgt (large steering force TQlarge) set when the driver steering operation force TQ_D of the reverse phase is input to the own vehicle 100 is larger than the target system intervention steering force TQ_Stgt (small steering force TQsmall) set when the driver steering operation force TQ_D of the same phase is input to the own vehicle 100. The vehicle driving support device 10 then sets the difference between the target system intervention steering force TQ_Stgt and the driver-required steering force TQ_Dreq as the target steering force TQtgt, and causes the steering device 23 to output a steering force corresponding to the target steering force TQtgt (applies a steering force corresponding to the target steering force TQtgt to the own vehicle 100).

At this time, the steering force applied to the own vehicle 100 is the steering force in the direction of returning the own vehicle 100 to the current lane LN when the driver-required steering force TQ_Dreq is smaller than the target system intervention steering force TQ_Stgt, and is a steering force in the direction of causing the own vehicle 100 to deviate from the current lane LN when the driver-required steering force TQ_Dreq is larger than the target system intervention steering force TQ_Stgt.

The small width reduction value dTQsmall is also a value set in accordance with the driver steering operation force TQ_D at that time, and in particular, is a value that increases as the driver steering operation force TQ_D increases. As described above, the small width reduction value dTQsmall is a value smaller than the large width reduction value dTQlarge. The small width reduction value dTQsmall is also acquired by applying the driver steering operation force TQ_D to the lookup table selected in accordance with the deviation risk at that time.

When neither the large width reduction condition nor the small width reduction condition is satisfied, as described above, the vehicle driving support device 10 sets the reference steering force TQbase as the target system intervention steering force TQ_Stgt, sets the target system intervention steering force TQ_Stgt as the target steering force TQtgt, and causes the steering device 23 to output a steering force corresponding to the target steering force TQtgt (applies a steering force corresponding to the target steering force TQtgt to the own vehicle 100).

Subsequently, the vehicle driving support device 10 determines whether a driver steering operation force TQ_D that is larger than a predetermined value (in this example, zero) is detected (input to the own vehicle 100) in a period (return control period) from when the right and left front wheels of the own vehicle 100 are returned to the current lane LN by the lane deviation suppression control until the lane deviation suppression control is terminated.

In other words, the vehicle driving support device 10 determines whether "the large width reduction condition that the post-intervention steering condition is satisfied during the return control period after the straight lane deviation condition is satisfied and the lane deviation suppression control is started" is satisfied.

The post-intervention steering condition used during the return control period after the own vehicle 100 reaches the left side deviation determination line LL, the straight lane deviation condition is satisfied, and the lane deviation suppression control is started is a condition that the driver steering operation force TQ_D that is larger than a predetermined value (in this example, zero) is detected (input to the own vehicle 100). The post-intervention steering condition does not include a condition for determining whether the detected driver steering operation force TQ_D is a torque of the same phase or a torque of the reverse phase.

When the large width reduction condition is satisfied, the vehicle driving support device 10 sets the value (small steering force TQsmall) obtained by subtracting a predetermined value (large width reduction value dTQlarge) from the reference steering force TQbase as the target value of the system intervention steering force (target system intervention steering force TQ_Stgt). Then, when the direction of the driver steering operation force TQ_D is the same as the direction of the system intervention steering force TQ_S, the vehicle driving support device 10 sets the total value of the target system intervention steering force TQ_Stgt and the driver-required steering force TQ_Dreq as the target steering force TQtgt, and when the direction of the driver steering operation force TQ_D is different from the direction of the system intervention steering force TQ_S, the vehicle driving support device 10 sets the difference between the target system intervention steering force TQ_Stgt and the driver-required steering force TQ_Dreq as the target steering force TQtgt. The vehicle driving support device 10 thus causes the steering device 23 to output a steering force corresponding to the target steering force TQtgt (applies a steering force corresponding to the target steering force TQtgt to the own vehicle 100).

In the case where the direction of the driver steering operation force TQ_D is different from the direction of the system intervention steering force TQ_S, when the driver-required steering force TQ_Dreq is larger than the system intervention steering force TQ_S, the direction of the steering force applied to the own vehicle 100 is the same as the direction of the driver steering operation force TQ_D, and when the driver-required steering force TQ_Dreq is smaller than the system intervention steering force TQ_S, the direction of the steering force applied to the own vehicle 100 is opposite to the direction of the driver steering operation force TQ_D.

On the other hand, when the large width reduction condition is not satisfied, as described above, the vehicle driving support device 10 sets the reference steering force TQbase as the target system intervention steering force TQ_Stgt, sets the target system intervention steering force TQ_Stgt as the target steering force TQtgt, and causes the steering device 23 to output a steering force corresponding to the target steering force TQtgt (applies a steering force corresponding to the target steering force TQtgt to the own vehicle 100).

Figure 4:
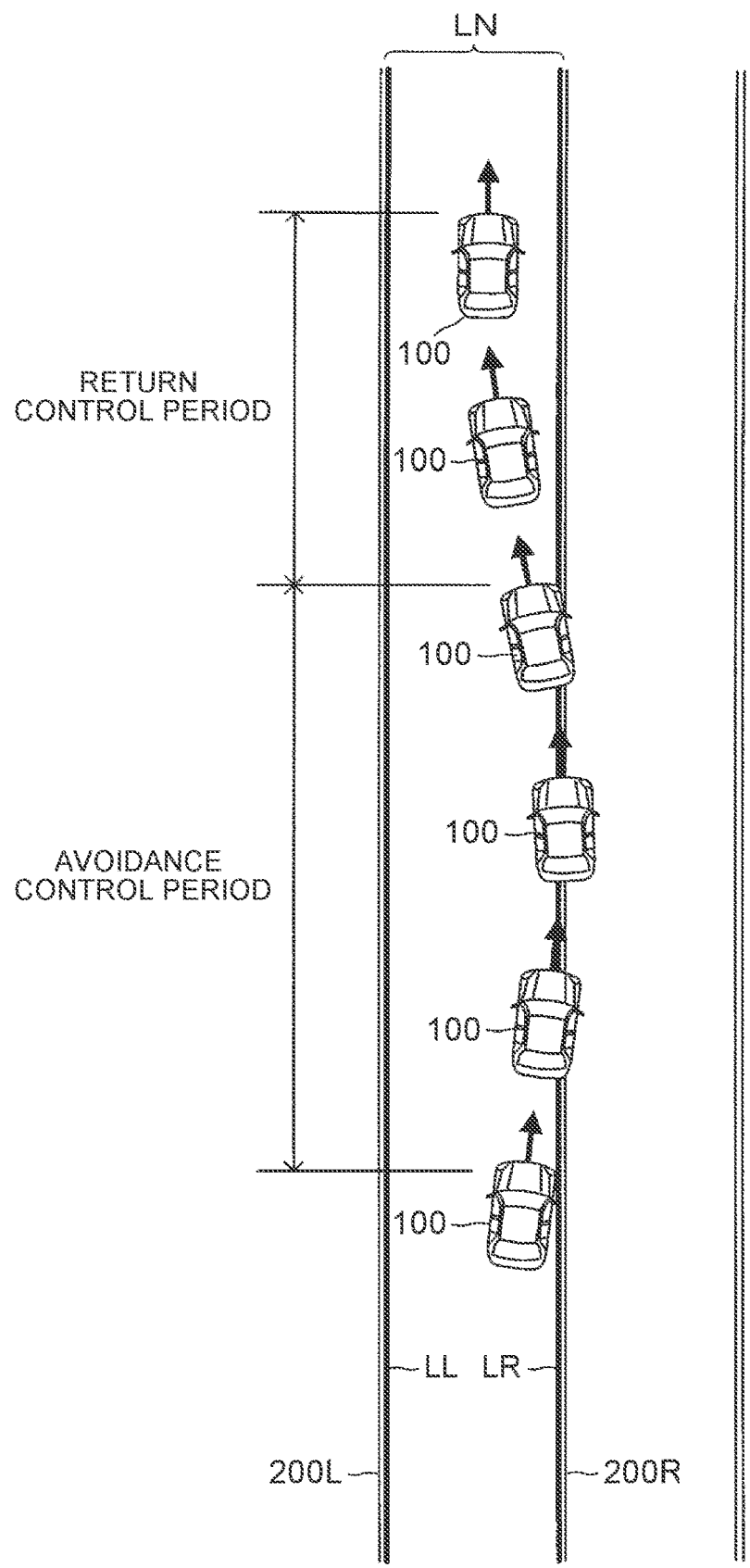
FIG. 4 is a diagram showing a situation in which the own vehicle traveling on the straight road deviates from the lane from the right side.

Right Side Deviation While Traveling on Straight Road Before Start of Lane Deviation Suppression Control As shown in FIG. 4, when the own vehicle 100 reaches the right side deviation determination line LR while traveling on a straight road (that is, when the right side distance DR becomes zero), the vehicle driving support device 10 determines whether a driver steering operation force TQ_D of the same phase (in-phase steering operation force) that is equal to or larger than the first threshold value TQ1 or a driver steering operation force TQ_D of the reverse phase (reverse-phase steering operation force) that is equal to or larger than the second threshold value TQ2 is detected.

In other words, the vehicle driving support device 10 determines whether "a control unnecessary condition that the straight lane deviation condition is satisfied while the pre-intervention in-phase condition is satisfied" is satisfied and whether "a control unnecessary condition that the straight lane deviation condition is satisfied while the pre-intervention reverse-phase condition is satisfied" is satisfied.

The straight lane deviation condition here is a condition that the own vehicle 100 has reached the right side deviation determination line LR while traveling on a straight road. The pre-intervention in-phase condition used when the straight lane deviation condition is satisfied is a condition that the driver steering operation force TQ_D of the same phase that is equal to or larger than the first threshold value TQ1 is detected (input to the own vehicle 100). The pre-intervention reverse-phase condition used when the straight lane deviation condition is satisfied is a condition that a driver steering operation force TQ_D of the reverse phase that is equal to or larger than the second threshold value TQ2 is detected (input to the own vehicle 100).

As described above, the driver steering operation force TQ_D of the same phase (in-phase steering operation force) is the driver steering operation force TQ_D that is applied in the direction of returning the own vehicle 100 that has deviated from the current lane LN to the current lane LN (deviation avoidance direction), and is the driver steering operation force TQ_D in the left (i.e., counterclockwise) direction in the situation shown in FIG. 4. Further, the driver steering operation force TQ_D of the reverse phase is the driver steering operation force TQ_D that is applied in the direction of causing the own vehicle 100 to deviate from the current lane LN (deviation direction), and is the driver steering operation force TQ_D in the right (i.e., clockwise) direction in the situation shown in FIG. 4.

When the control unnecessary condition is satisfied, the vehicle driving support device 10 continues the normal steering control without executing the lane deviation suppression control.

On the other hand, when the control unnecessary condition is not satisfied, the vehicle driving support device 10 starts the lane deviation suppression control. After the start of the lane deviation suppression control, unless the large width reduction condition and the small width reduction condition described below are satisfied, the vehicle driving support device 10 sets the reference steering force TQbase as the target system intervention steering force TQ_Stgt, sets the target system intervention steering force TQ_Stgt as the target steering force TQtgt, and causes the steering device 23 to output a steering force corresponding to the target steering force TQtgt.

As described above, when the driver is operating the steering wheel 35 in the direction of returning the own vehicle 100 to the current lane LN in the case where the own vehicle 100 traveling on a straight road may deviate from the current lane LN (in the case where the straight lane deviation condition is satisfied), it is presumed that the driver is operating the steering wheel 35 himself/herself in an attempt to return the own vehicle 100 to the current lane LN, and thus the deviation risk is small. Therefore, the vehicle driving support device 10 does not execute the lane deviation suppression control even when the driver steering operation force TQ_D at that time is relatively small (that is, when the driver steering operation force TQ_D at that time is equal to or larger than the first threshold value TQ1).

On the other hand, when the driver is operating the steering wheel 35 in the direction of causing the own vehicle 100 to deviate from the current lane LN in the case where the own vehicle 100 traveling on a straight road may deviate from the current lane LN (in the case where the straight lane deviation condition is satisfied), the deviation risk is large, so that the vehicle driving support device 10 basically executes the lane deviation suppression control. However, when the driver steering operation force TQ_D at that time is relatively large (that is, when the driver steering operation force TQ_D at that time is equal to or larger than the second threshold value TQ2), it is presumed that the driver is intentionally attempting to cause the own vehicle 100 to deviate from the current lane LN, so that the vehicle driving support device 10 does not execute the lane deviation suppression control.

After Start of Lane Deviation Suppression Control

When the vehicle driving support device 10 starts the lane deviation suppression control, the vehicle driving support device 10 monitors the driver steering operation force TQ_D during the execution of the lane deviation suppression control.

The vehicle driving support device 10 determines whether the driver steering operation force TQ_D of the same phase that is larger than a predetermined value (in this example, zero) or the driver steering operation force TQ_D of the reverse phase that is larger than a predetermined value (in this example, zero) is detected in the avoidance control period after the start of the lane deviation suppression control.

In other words, the vehicle driving support device 10 determines whether "the large width reduction condition that the post-intervention in-phase condition is satisfied during the avoidance control period after the straight lane deviation condition is satisfied and the lane deviation suppression control is started" is satisfied, and whether "the small reduction condition that the post-control start reverse-phase condition is satisfied during the avoidance control period after the straight lane deviation condition is satisfied and the lane deviation suppression control is started" is satisfied.

The post-intervention in-phase condition used during the avoidance control period after the own vehicle 100 reaches the right side deviation determination line LR, the straight lane deviation condition is satisfied, and the lane deviation suppression control is started is a condition that the driver steering operation force TQ_D of the same phase that is larger than a predetermined value (in this example, zero) is detected.

Further, the post-control start reverse-phase condition used during the avoidance control period after the own vehicle 100 reaches the right side deviation determination line LR, the straight lane deviation condition is satisfied, and the lane deviation suppression control is started is a condition that the driver steering operation force TQ_D of the reverse phase that is larger than a predetermined value (in this example, zero) is detected.

When the large width reduction condition is satisfied, the vehicle driving support device 10 sets the value (small steering force TQsmall) obtained by subtracting a predetermined value (large width reduction value dTQlarge) from the reference steering force TQbase as the target value of the system intervention steering force (target system intervention steering force TQ_Stgt). The vehicle driving support device 10 then sets the total value of the target system intervention steering force TQ_Stgt and the driver-required steering force TQ_Dreq as the target steering force TQtgt, and causes the steering device 23 to output a steering force corresponding to the target steering force TQtgt (applies a steering force corresponding to the target steering force TQtgt to the own vehicle 100).

The steering force applied to the own vehicle 100 at this time is the steering force in the direction of returning the own vehicle 100 to the current lane LN, and in this example, is a steering force having a magnitude corresponding to the reference steering force TQbase. That is, in this example, the large width reduction value dTQlarge is set so that the target steering force TQtgt becomes a value that matches the reference steering force TQbase.

On the other hand, when the small width reduction condition is satisfied, the vehicle driving support device 10 sets the value (large steering force TQlarge) obtained by subtracting a predetermined value (small width reduction value dTQsmall) smaller than the large width reduction value dTQlarge from the reference steering force TQbase as the target value of the system intervention steering force (target system intervention steering force TQ_Stgt). Therefore, as described above, the target system intervention steering force TQ_Stgt (large steering force TQlarge) set when the driver steering operation force TQ_D of the reverse phase is input to the own vehicle 100 is larger than the target system intervention steering force TQ_Stgt (small steering force TQsmall) set when the driver steering operation force TQ_D of the same phase is input to the own vehicle 100. The vehicle driving support device 10 then sets the difference between the target system intervention steering force TQ_Stgt and the driver-required steering force TQ_Dreq as the target steering force TQtgt, and causes the steering device 23 to output a steering force corresponding to the target steering force TQtgt (applies a steering force corresponding to the target steering force TQtgt to the own vehicle 100).

At this time, the steering force applied to the own vehicle 100 is the steering force in the direction of returning the own vehicle 100 to the current lane LN when the driver-required steering force TQ_Dreq is smaller than the target system intervention steering force TQ_Stgt, and is a steering force in the direction of causing the own vehicle 100 to deviate from the current lane LN when the driver-required steering force TQ_Dreq is larger than the target system intervention steering force TQ_Stgt.

When neither the large width reduction condition nor the small width reduction condition is satisfied, as described above, the vehicle driving support device 10 sets the reference steering force TQbase as the target system intervention steering force TQ_Stgt, sets the target system intervention steering force TQ_Stgt as the target steering force TQtgt, and causes the steering device 23 to output a steering force corresponding to the target steering force TQtgt.

Subsequently, the vehicle driving support device 10 determines whether the driver steering operation force TQ_D larger than a predetermined value (in this example, zero) is detected in the return control period.

In other words, the vehicle driving support device 10 determines whether "the large width reduction condition that the post-intervention steering condition is satisfied during the return control period after the straight lane deviation condition is satisfied and the lane deviation suppression control is started" is satisfied.

The post-intervention steering condition used during the return control period after the own vehicle 100 reaches the right side deviation determination line LR, the straight lane deviation condition is satisfied, and the lane deviation suppression control is started is a condition that the driver steering operation force TQ_D larger than a predetermined value (in this example, zero) is detected. The post-intervention steering condition does not include a condition for determining whether the detected driver steering operation force TQ_D is a torque of the same phase or a torque of the reverse phase.

When the large width reduction condition is satisfied, the vehicle driving support device 10 sets the value (small steering force TQsmall) obtained by subtracting a predetermined value (large width reduction value dTQlarge) from the reference steering force TQbase as the target value of the system intervention steering force (target system intervention steering force TQ_Stgt). Then, when the direction of the driver steering operation force TQ_D is the same as the direction of the system intervention steering force TQ_S, the vehicle driving support device 10 sets the total value of the target system intervention steering force TQ_Stgt and the driver-required steering force TQ_Dreq as the target steering force TQtgt, and when the direction of the driver steering operation force TQ_D is different from the direction of the system intervention steering force TQ_S, the vehicle driving support device 10 sets the difference between the target system intervention steering force TQ_Stgt and the driver-required steering force TQ_Dreq as the target steering force TQtgt. The vehicle driving support device 10 thus causes the steering device 23 to output a steering force corresponding to the target steering force TQtgt (applies a steering force corresponding to the target steering force TQtgt to the own vehicle 100).

In the case where the direction of the driver steering operation force TQ_D is different from the direction of the system intervention steering force TQ_S, when the driver-required steering force TQ_Dreq is larger than the system intervention steering force TQ_S, the direction of the steering force applied to the own vehicle 100 is the same as the direction of the driver steering operation force TQ_D, and when the driver-required steering force TQ_Dreq is smaller than the system intervention steering force TQ_S, the direction of the steering force applied to the own vehicle 100 is opposite to the direction of the driver steering operation force TQ_D.

On the other hand, when the large width reduction condition is not satisfied, as described above, the vehicle driving support device 10 sets the reference steering force TQbase as the target system intervention steering force TQ_Stgt, sets the target system intervention steering force TQ_Stgt as the target steering force TQtgt, and causes the steering device 23 to output a steering force corresponding to the target steering force TQtgt.

As described above, when the driver operates the steering wheel 35 in the direction of returning the own vehicle 100 to the current lane LN in the case where the own vehicle 100 traveling on a straight road is being returned to the current lane LN by the lane deviation suppression control (during the avoidance control period), it is presumed that the driver is operating the steering wheel 35 himself/herself in an attempt to return the own vehicle 100 to the current lane LN. Thus, even if the system intervention steering force TQ_S is significantly reduced in accordance with the driver steering operation force TQ_D, the deviation risk is small, and since it is possible to suppress the driver from feeling uncomfortable with the operation of the steering wheel 35 when the system intervention steering force TQ_S is significantly reduced in accordance with the driver steering operation force TQ_D, the vehicle driving support device 10 significantly reduces the system intervention steering force TQ_S in accordance with the driver steering operation force TQ_D.

On the other hand, when the driver operates the steering wheel 35 in the direction of causing the own vehicle 100 to deviate from the current lane LN while the own vehicle 100 traveling on a straight road is being returned to the current lane LN by the lane deviation suppression control (during the avoidance control period), it is unlikely that the driver intentionally attempts to cause the own vehicle 100 to deviate from the current lane LN. Thus, if the system intervention steering force TQ_S is significantly reduced in accordance with the steering operation force TQ_D, the deviation risk is large, so that the vehicle driving support device 10 reduces the width of reducing the system intervention steering force TQ_S.

Further, when the driver operates the steering wheel 35 after the own vehicle 100 is returned to the current lane LN by the lane deviation suppression control while the own vehicle 100 is traveling on a straight road (during the return control period), it is presumed that the driver is attempting to cause the own vehicle 100 to travel in the current lane LN regardless of whether the operation of the steering wheel 35 is a leftward operation or a rightward operation. Thus, even if the system intervention steering force TQ_S is significantly reduced in accordance with the driver steering operation force TQ_D, the deviation risk is small, and since it is possible to suppress the driver from feeling uncomfortable with the operation of the steering wheel 35 when the system intervention steering force TQ_S is significantly reduced in accordance with the driver steering operation force TQ_D, the vehicle driving support device 10 significantly reduces the system intervention steering force TQ_S in accordance with the driver steering operation force TQ_D.

Figure 5:
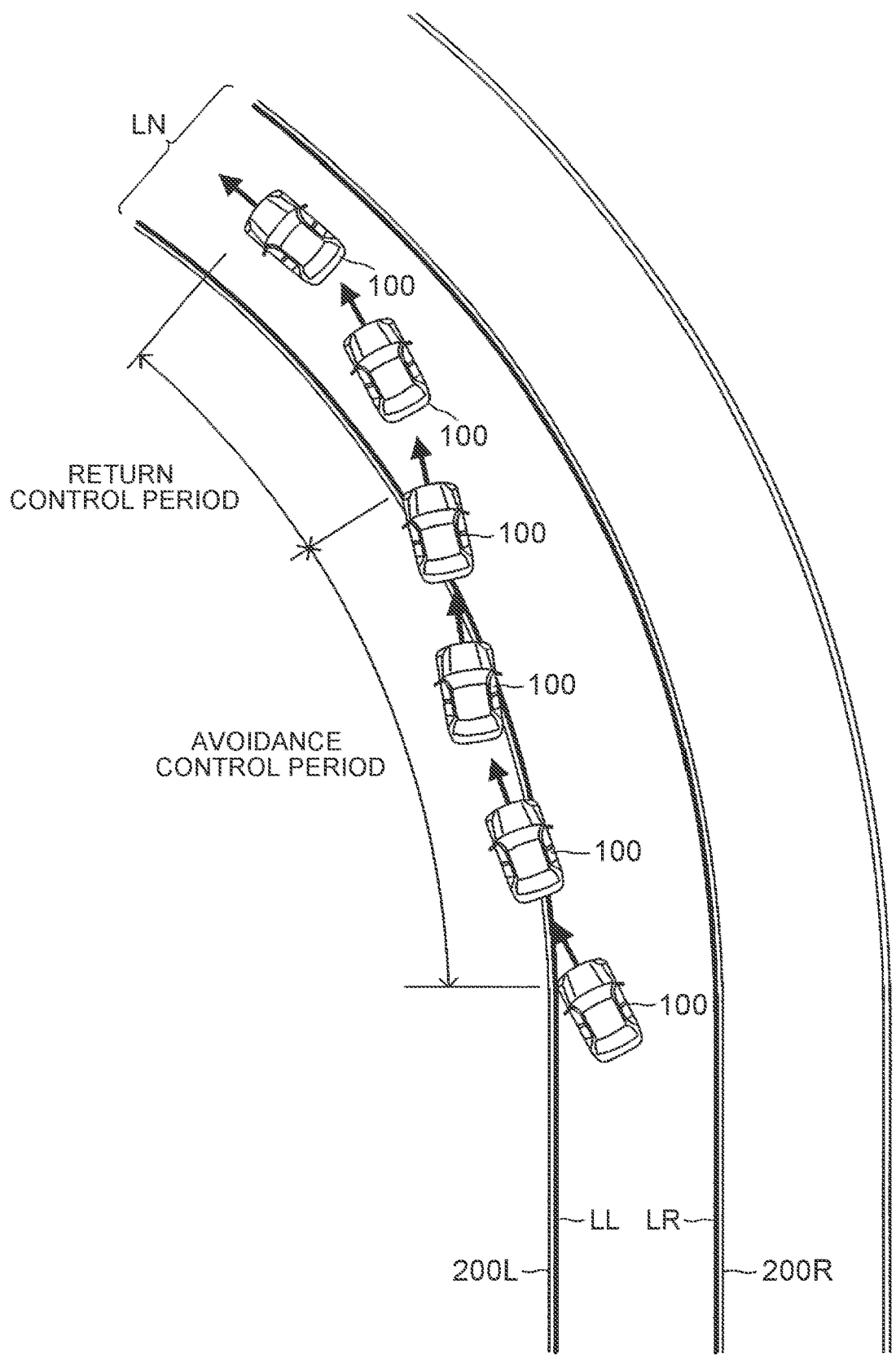
FIG. 5 is a diagram showing a situation in which the own vehicle traveling on a left curve road deviates from the lane from the inside of the curve.

Inner Deviation While Traveling on Left Curve Road Before Start of Lane Deviation Suppression Control As shown in FIG. 5, when the own vehicle 100 reaches the left side deviation determination line LL (curve inner deviation determination line) while traveling on a left curve road, the vehicle driving support device 10 determines whether a driver steering operation force TQ_D of the same phase (in-phase steering operation force) that is equal to or larger than the first threshold value TQ1 or a driver steering operation force TQ_D of the reverse phase (reverse-phase steering operation force) that is equal to or larger than the second threshold value TQ2 is detected.

In other words, the vehicle driving support device 10 determines whether "a control unnecessary condition that the curve inner lane deviation condition is satisfied while the pre-intervention in-phase condition is satisfied" is satisfied and whether "a control unnecessary condition that the curve inner lane deviation condition is satisfied while the pre-intervention reverse-phase condition is satisfied" is satisfied.

The curve inner lane deviation condition here is a condition that the own vehicle 100 has reached the left side deviation determination line LL (curve inner deviation determination line) while traveling on a left curve road. The pre-intervention in-phase condition and the pre-intervention reverse-phase condition used when the own vehicle 100 reaches the left side deviation determination line LL and the curve inner lane deviation condition is satisfied are each the same as the pre-intervention in-phase condition and the pre-intervention reverse-phase condition used when the straight lane deviation condition is satisfied, but may be different conditions by using different values as predetermined values used for determining whether the conditions are satisfied.

In the situation shown in FIG. 5, the driver steering operation force TQ_D of the same phase (in-phase steering operation force) is the driver steering operation force TQ_D in the right (i.e., clockwise) direction, and the driver steering operation force TQ_D of the reverse phase (reverse-phase steering operation force) is the driver steering operation force TQ_D in the left (i.e., counterclockwise) direction.

When the control unnecessary condition is satisfied, the vehicle driving support device 10 continues the normal steering control without executing the lane deviation suppression control.

On the other hand, when the control unnecessary condition is not satisfied, the vehicle driving support device 10 starts the lane deviation suppression control. After the start of the lane deviation suppression control, unless the large width reduction condition and the small width reduction condition described below are satisfied, the vehicle driving support device 10 sets the reference steering force TQbase as the target system intervention steering force TQ_Stgt, sets the target system intervention steering force TQ_Stgt as the target steering force TQtgt, and causes the steering device 23 to output a steering force corresponding to the target steering force TQtgt.

As described above, when the driver is operating the steering wheel 35 in the direction of returning the own vehicle 100 to the current lane LN in the case where the own vehicle 100 traveling on a left curve road may deviate from the left side of the current lane LN (in the case where the curve inner lane deviation condition is satisfied), it is presumed that the driver is operating the steering wheel 35 in an attempt to return the own vehicle 100 to the current lane LN, and thus the deviation risk is small. Therefore, the vehicle driving support device 10 does not execute the lane deviation suppression control even when the driver steering operation force TQ_D at that time is relatively small (that is, when the driver steering operation force TQ_D at that time is equal to or larger than the first threshold value TQ1).

On the other hand, when the driver is operating the steering wheel 35 in the direction of causing the own vehicle 100 to deviate from the current lane LN in the case where the own vehicle 100 traveling on a left curve road may deviate from the left side of the current lane LN (in the case where the curve inner lane deviation condition is satisfied), the deviation risk is large, so that the vehicle driving support device 10 basically executes the lane deviation suppression control. When the driver steering operation force TQ_D at that time is relatively large (that is, when the driver steering operation force TQ_D at that time is equal to or larger than the second threshold value TQ2), it is presumed that the driver is intentionally attempting to cause the own vehicle 100 to deviate from the current lane LN, so that the vehicle driving support device 10 does not execute the lane deviation suppression control.

After Start of Lane Deviation Suppression Control

When the vehicle driving support device 10 starts the lane deviation suppression control, the vehicle driving support device 10 monitors the driver steering operation force TQ_D during the execution of the lane deviation suppression control.

The vehicle driving support device 10 determines whether the driver steering operation force TQ_D of the same phase that is larger than a predetermined value (in this example, zero) or the driver steering operation force TQ_D of the reverse phase that is larger than a predetermined value (in this example, zero) is detected in the avoidance control period after the start of the lane deviation suppression control.

In other words, the vehicle driving support device 10 determines whether "the large width reduction condition that the post-intervention in-phase condition is satisfied during the avoidance control period after the curve inner lane deviation condition is satisfied and the lane deviation suppression control is started" is satisfied, and whether "the small width reduction condition that the post-intervention reverse-phase condition is satisfied during the avoidance control period after the curve inner lane deviation condition is satisfied and the lane deviation suppression control is started" is satisfied.

When the large width reduction condition is satisfied, the vehicle driving support device 10 sets the small steering force TQsmall as the target system intervention steering force TQ_Stgt. The vehicle driving support device 10 then sets the total value of the target system intervention steering force TQ_Stgt and the driver-required steering force TQ_Dreq as the target steering force TQtgt, and causes the steering device 23 to output a steering force corresponding to the target steering force TQtgt.

The steering force applied to the own vehicle 100 at this time is the steering force in the direction of returning the own vehicle 100 to the current lane LN, and in this example, is a steering force having a magnitude corresponding to the reference steering force TQbase.

On the other hand, when the small width reduction condition is satisfied, the vehicle driving support device 10 sets the large steering force TQlarge as the target system intervention steering force TQ_Stgt. The vehicle driving support device 10 then sets the difference between the target system intervention steering force TQ_Stgt and the driver-required steering force TQ_Dreq as the target steering force TQtgt, and causes the steering device 23 to output a steering force corresponding to the target steering force TQtgt.

At this time, the steering force applied to the own vehicle 100 is the steering force in the direction of returning the own vehicle 100 to the current lane LN when the driver-required steering force TQ_Dreq is smaller than the target system intervention steering force TQ_Stgt, and is a steering force in the direction of causing the own vehicle 100 to deviate from the current lane LN when the driver-required steering force TQ_Dreq is larger than the target system intervention steering force TQ_Stgt.

When neither the large width reduction condition nor the small width reduction condition is satisfied, as described above, the vehicle driving support device 10 sets the reference steering force TQbase as the target system intervention steering force TQ_Stgt, sets the target system intervention steering force TQ_Stgt as the target steering force TQtgt, and causes the steering device 23 to output a steering force corresponding to the target steering force TQtgt.

Subsequently, the vehicle driving support device 10 determines whether the driver steering operation force TQ_D larger than a predetermined value (in this example, zero) is detected in the return control period.

In other words, the vehicle driving support device 10 determines whether "the large width reduction condition that the post-intervention steering condition is satisfied during the return control period after the curve inner lane deviation condition is satisfied and the lane deviation suppression control is started" is satisfied.

The post-intervention steering condition used during the return control period after the curve inner lane deviation condition is satisfied and the lane deviation suppression control is started is the same as the post-intervention steering condition used during the return control period after the straight lane deviation condition is satisfied and the lane deviation suppression control is started, but may be different conditions by using different values as predetermined values used for determining whether the conditions are satisfied.

When the large width reduction condition is satisfied, the vehicle driving support device 10 sets the small steering force TQsmall as the target system intervention steering force TQ_Stgt. Then, when the direction of the driver steering operation force TQ_D is the same as the direction of the system intervention steering force TQ_S, the vehicle driving support device 10 sets the total value of the target system intervention steering force TQ_Stgt and the driver-required steering force TQ_Dreq as the target steering force TQtgt, and when the direction of the driver steering operation force TQ_D is different from the direction of the system intervention steering force TQ_S, the vehicle driving support device 10 sets the difference between the target system intervention steering force TQ_Stgt and the driver-required steering force TQ_Dreq as the target steering force TQtgt. The vehicle driving support device 10 thus causes the steering device 23 to output a steering force corresponding to the target steering force TQtgt.

In the case where the direction of the driver steering operation force TQ_D is different from the direction of the system intervention steering force TQ_S, when the driver-required steering force TQ_Dreq is larger than the system intervention steering force TQ_S, the direction of the steering force applied to the own vehicle 100 is the same as the direction of the driver steering operation force TQ_D, and when the driver-required steering force TQ_Dreq is smaller than the system intervention steering force TQ_S, the direction of the steering force applied to the own vehicle 100 is opposite to the direction of the driver steering operation force TQ_D.

On the other hand, when the large width reduction condition is not satisfied, as described above, the vehicle driving support device 10 sets the reference steering force TQbase as the target system intervention steering force TQ_Stgt, sets the target system intervention steering force TQ_Stgt as the target steering force TQtgt, and causes the steering device 23 to output a steering force corresponding to the target steering force TQtgt.

As described above, when the driver operates the steering wheel 35 in the direction of returning the own vehicle 100 to the current lane LN while the own vehicle 100 traveling on a left curve road and having deviated from the current lane LN from the inside of the curve is being returned to the current lane LN by the lane deviation suppression control (during the avoidance control period), it is presumed that the driver is operating the steering wheel 35 in an attempt to return the own vehicle 100 to the current lane LN. Thus, even if the system intervention steering force TQ_S is significantly reduced in accordance with the driver steering operation force TQ_D, the deviation risk is small, and since it is possible to suppress the driver from feeling uncomfortable with the operation of the steering wheel 35 when the system intervention steering force TQ_S is significantly reduced in accordance with the driver steering operation force TQ_D, the vehicle driving support device 10 significantly reduces the system intervention steering force TQ_S in accordance with the driver steering operation force TQ_D.

On the other hand, when the driver operates the steering wheel 35 in the direction of causing the own vehicle 100 to deviate from the current lane LN while the own vehicle 100 traveling on a left curve road and having deviated from the current lane LN from the inside of the curve is being returned to the current lane LN by the lane deviation suppression control (during the avoidance control period), it is unlikely that the driver intentionally attempts to cause the own vehicle 100 to deviate from the current lane LN. Thus, if the system intervention steering force TQ_S is significantly reduced in accordance with the steering operation force TQ_D, the deviation risk is large, so that the vehicle driving support device 10 reduces the width of reducing the system intervention steering force TQ_S.

Further, when the driver operates the steering wheel 35 after the own vehicle 100 is returned to the current lane LN by the lane deviation suppression control while the own vehicle 100 traveling on a left curve road has deviated from the current lane LN from the inside of the curve (during the return control period), it is presumed that the driver is attempting to cause the own vehicle 100 to travel in the current lane LN regardless of whether the operation of the steering wheel 35 is a leftward operation or a rightward operation. Thus, even if the system intervention steering force TQ_S is significantly reduced in accordance with the driver steering operation force TQ_D, the deviation risk is small, and since it is possible to suppress the driver from feeling uncomfortable with the operation of the steering wheel 35 when the system intervention steering force TQ_S is significantly reduced in accordance with the driver steering operation force TQ_D, the vehicle driving support device 10 significantly reduces the system intervention steering force TQ_S in accordance with the driver steering operation force TQ_D.

Figure 6:
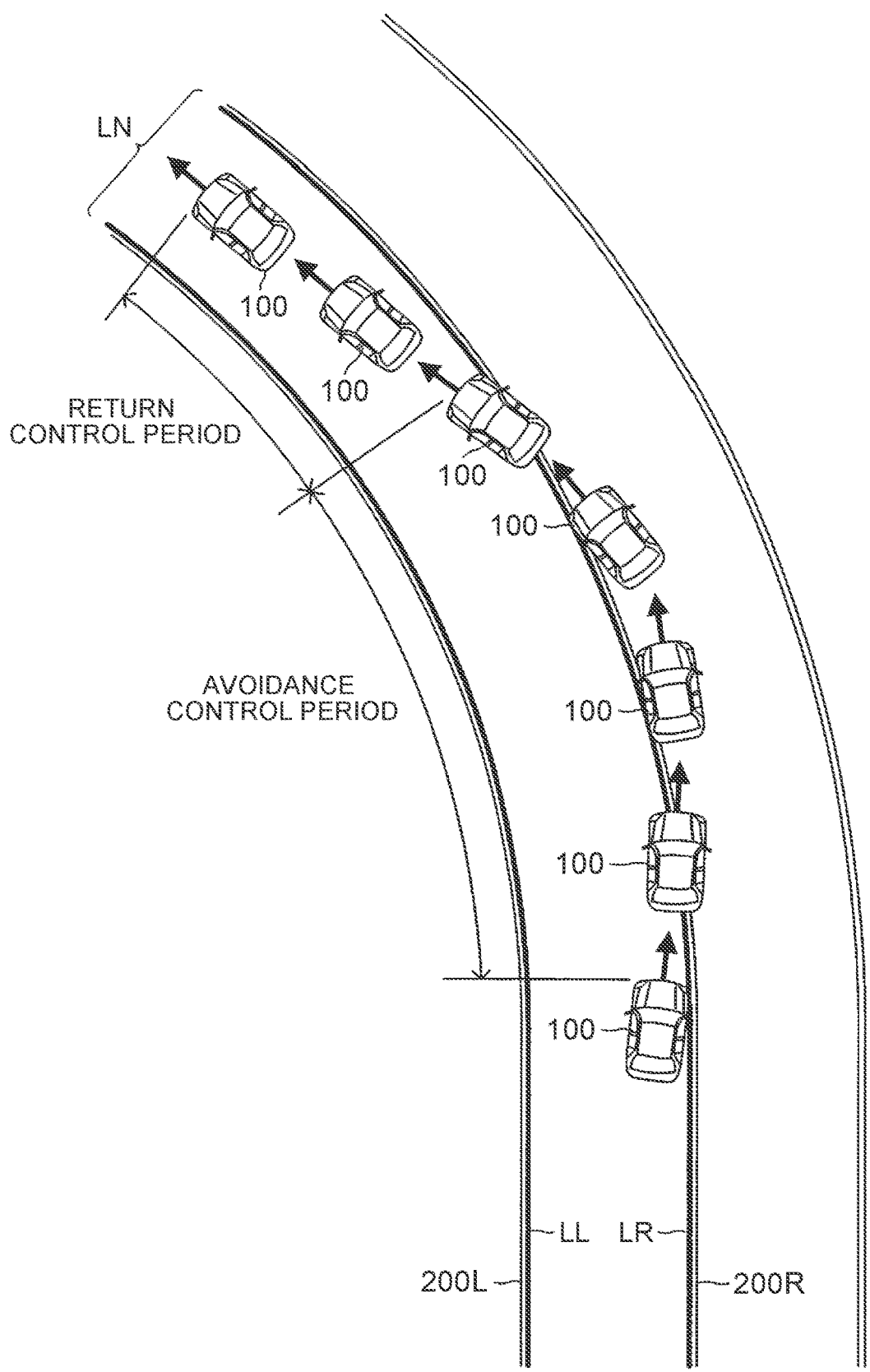
FIG. 6 is a diagram showing a situation in which the own vehicle traveling on the left curve road deviates from the lane from the outside of the curve.

Outer Deviation While Traveling on Left Curve Road
Before Start of Lane Deviation Suppression Control As shown in FIG. 6, when the own vehicle 100 reaches the right side deviation determination line LR (curve outer deviation determination line) while traveling on a left curve road, the vehicle driving support device 10 determines whether a driver steering operation force TQ_D of the same phase (in-phase steering operation force) that is equal to or larger than the third threshold value TQ3 or a driver steering operation force TQ_D of the reverse phase (reverse-phase steering operation force) that is equal to or larger than the second threshold value TQ2 is detected.

In other words, the vehicle driving support device 10 determines whether "a control unnecessary condition that the curve outer lane deviation condition is satisfied while the pre-intervention in-phase condition is satisfied" is satisfied and whether "a control unnecessary condition that the curve outer lane deviation condition is satisfied while the pre-intervention reverse-phase condition is satisfied" is satisfied.

The curve outer lane deviation condition here is a condition that the own vehicle 100 has reached the right side deviation determination line LR (curve outer deviation determination line) while traveling on a left curve road. Unlike the pre-intervention in-phase condition used when the straight lane deviation condition or the curve inner lane deviation condition is satisfied, the pre-intervention in-phase condition used when the own vehicle 100 reaches the right side deviation determination line LR and the curve outer lane deviation condition is satisfied is a condition that a driver steering operation force TQ_D of the same phase that is equal to or larger than the third threshold value TQ3 is detected. Further, unlike the pre-intervention reverse-phase condition used when the straight lane deviation condition or the curve inner lane deviation condition is satisfied, the pre-intervention reverse-phase condition used when the own vehicle 100 reaches the right side deviation determination line LR and the curve outer lane deviation condition is satisfied is a condition that a driver steering operation force TQ_D of the reverse phase that is equal to or larger than the second threshold value TQ2 is detected.

In the situation shown in FIG. 6, the driver steering operation force TQ_D of the same phase (in-phase steering operation force) is the driver steering operation force TQ_D in the left (i.e., counterclockwise) direction, and the driver steering operation force TQ_D of the reverse phase (reverse-phase steering operation force) is the driver steering operation force TQ_D in the right (i.e., clockwise) direction.

When the control unnecessary condition is satisfied, the vehicle driving support device 10 continues the normal steering control without executing the lane deviation suppression control.

On the other hand, when the control unnecessary condition is not satisfied, the vehicle driving support device 10 starts the lane deviation suppression control. After the start of the lane deviation suppression control, unless the large width reduction condition and the small width reduction condition described below are satisfied, the vehicle driving support device 10 sets the reference steering force TQbase as the target system intervention steering force TQ_Stgt, sets the target system intervention steering force TQ_Stgt as the target steering force TQtgt, and causes the steering device 23 to output a steering force corresponding to the target steering force TQtgt.

As described above, when the driver is operating the steering wheel 35 in the direction of returning the own vehicle 100 to the current lane LN in the case where the own vehicle 100 traveling on a left curve road may deviate from the right side of the current lane LN (in the case where the curve outer lane deviation condition is satisfied), it is presumed that the driver is operating the steering wheel 35 in an attempt to return the own vehicle 100 to the current lane LN, but the amount of operation of the steering wheel 35 is insufficient, which is causing the own vehicle 100 to deviate from the outside of the left curve road. In this case, the deviation risk is large, so that the vehicle driving support device 10 basically executes the lane deviation suppression control. When the driver steering operation force TQ_D at that time is sufficiently large (that is, when the driver steering operation force TQ_D at that time is equal to or larger than the third threshold value TQ3), it is presumed that the driver is intentionally attempting to cause the own vehicle 100 to deviate from the current lane LN, so that the vehicle driving support device 10 does not execute the lane deviation suppression control.

On the other hand, when the driver is operating the steering wheel 35 in the direction of causing the own vehicle 100 to deviate from the current lane LN in the case where the own vehicle 100 traveling on a left curve road may deviate from the right side of the current lane LN (in the case where the curve outer lane deviation condition is satisfied), the deviation risk is large, so that the vehicle driving support device 10 basically executes the lane deviation suppression control. When the driver steering operation force TQ_D at that time is relatively large (that is, when the driver steering operation force TQ_D at that time is equal to or larger than the second threshold value TQ2), it is presumed that the driver is intentionally attempting to cause the own vehicle 100 to deviate from the current lane LN, so that the vehicle driving support device 10 does not execute the lane deviation suppression control.

After Start of Lane Deviation Suppression Control

When the vehicle driving support device 10 starts the lane deviation suppression control, the vehicle driving support device 10 monitors the driver steering operation force TQ_D during the execution of the lane deviation suppression control.

The vehicle driving support device 10 determines whether the driver steering operation force TQ_D larger than a predetermined value (in this example, zero) is detected in the avoidance control period after the start of the lane deviation suppression control.

In other words, the vehicle driving support device 10 determines whether "the small width reduction condition that the post-intervention steering condition is satisfied during the avoidance control period after the curve outer lane deviation condition is satisfied and the lane deviation suppression control is started" is satisfied.

The post-intervention steering condition used during the avoidance control period after the own vehicle 100 reaches the right side deviation determination line LR, the curve outer lane deviation condition is satisfied, and the lane deviation suppression control is started is the same as the post-intervention steering condition used during the avoidance control period after the straight lane deviation condition or the curve inner lane deviation condition is satisfied and the lane deviation suppression control is started, but may be different conditions by using different values as predetermined values used for determining whether the conditions are satisfied.

When the small width reduction condition is satisfied, the vehicle driving support device 10 sets the large steering force TQlarge as the target system intervention steering force TQ_Stgt. Then, when the direction of the driver steering operation force TQ_D is the same as the direction of the system intervention steering force TQ_S, the vehicle driving support device 10 sets the total value of the target system intervention steering force TQ_Stgt and the driver-required steering force TQ_Dreq as the target steering force TQtgt, and when the direction of the driver steering operation force TQ_D is different from the direction of the system intervention steering force TQ_S, the vehicle driving support device 10 sets the difference between the target system intervention steering force TQ_Stgt and the driver-required steering force TQ_Dreq as the target steering force TQtgt. The vehicle driving support device 10 thus causes the steering device 23 to output a steering force corresponding to the target steering force TQtgt.

In the case where the direction of the driver steering operation force TQ_D is different from the direction of the system intervention steering force TQ_S, when the driver-required steering force TQ_Dreq is larger than the system intervention steering force TQ_S, the direction of the steering force applied to the own vehicle 100 is the same as the direction of the driver steering operation force TQ_D, and when the driver-required steering force TQ_Dreq is smaller than the system intervention steering force TQ_S, the direction of the steering force applied to the own vehicle 100 is opposite to the direction of the driver steering operation force TQ_D.

On the other hand, when the small width reduction condition is not satisfied, as described above, the vehicle driving support device 10 sets the reference steering force TQbase as the target system intervention steering force TQ_Stgt, sets the target system intervention steering force TQ_Stgt as the target steering force TQtgt, and causes the steering device 23 to output a steering force corresponding to the target steering force TQtgt.

Subsequently, the vehicle driving support device 10 determines whether the driver steering operation force TQ_D larger than a predetermined value (in this example, zero) is detected in the return control period.

In other words, the vehicle driving support device 10 determines whether "the large width reduction condition that the post-intervention steering condition is satisfied during the return control period after the curve outer lane deviation condition is satisfied and the lane deviation suppression control is started" is satisfied.

The post-intervention steering condition used during the return control period after the own vehicle 100 reaches the right side deviation determination line LR, the curve outer lane deviation condition is satisfied, and the lane deviation suppression control is started is the same as the post-intervention steering condition used during the return control period after the straight lane deviation condition or the curve inner lane deviation condition is satisfied and the lane deviation suppression control is started, but may be different conditions by using different values as predetermined values used for determining whether the conditions are satisfied.

When the large width reduction condition is satisfied, the vehicle driving support device 10 sets the small steering force TQsmall as the target system intervention steering force TQ_Stgt. Then, when the direction of the driver steering operation force TQ_D is the same as the direction of the system intervention steering force TQS, the vehicle driving support device 10 sets the total value of the target system intervention steering force TQ_Stgt and the driver-required steering force TQ_Dreq as the target steering force TQtgt, and when the direction of the driver steering operation force TQ_D is different from the direction of the system intervention steering force TQ_S, the vehicle driving support device 10 sets the difference between the target system intervention steering force TQ_Stgt and the driver-required steering force TQ_Dreq as the target steering force TQtgt. The vehicle driving support device 10 thus causes the steering device 23 to output a steering force corresponding to the target steering force TQtgt.

In the case where the direction of the driver steering operation force TQ_D is different from the direction of the system intervention steering force TQ_S, when the driver-required steering force TQ_Dreq is larger than the system intervention steering force TQ_S, the direction of the steering force applied to the own vehicle 100 is the same as the direction of the driver steering operation force TQ_D, and when the driver-required steering force TQ_Dreq is smaller than the system intervention steering force TQ_S, the direction of the steering force applied to the own vehicle 100 is opposite to the direction of the driver steering operation force TQ_D.

On the other hand, when the large width reduction condition is not satisfied, as described above, the vehicle driving support device 10 sets the reference steering force TQbase as the target system intervention steering force TQ_Stgt, sets the target system intervention steering force TQ_Stgt as the target steering force TQtgt, and causes the steering device 23 to output a steering force corresponding to the target steering force TQtgt.

As described above, when the driver operates the steering wheel 35 in the direction of returning the own vehicle 100 to the current lane LN while the own vehicle 100 traveling on a left curve road and having deviated from the current lane LN from the outside of the curve is being returned to the current lane LN by the lane deviation suppression control (during the avoidance control period), it is presumed that the driver is operating the steering wheel 35 in an attempt to return the own vehicle 100 to the current lane LN, but the amount of operation of the steering wheel 35 is insufficient, which is causing the own vehicle 100 to deviate from the outside of the left curve road. In this case, the deviation risk is large, so that the vehicle driving support device 10 reduces the width of reducing the system intervention steering force TQ_S.

On the other hand, when the driver operates the steering wheel 35 in the direction of causing the own vehicle 100 to deviate from the current lane LN while the own vehicle 100 traveling on a left curve road and having deviated from the current lane LN from the outside of the curve is being returned to the current lane LN by the lane deviation suppression control (during the avoidance control period), it is unlikely that the driver intentionally attempts to cause the own vehicle 100 to deviate from the current lane LN. Thus, if the system intervention steering force TQ_S is significantly reduced in accordance with the steering operation force TQ_D, the deviation risk is large, so that the vehicle driving support device 10 reduces the width of reducing the system intervention steering force TQ_S.

Further, when the driver operates the steering wheel 35 after the own vehicle 100 is returned to the current lane LN by the lane deviation suppression control while the own vehicle 100 traveling on a left curve road has deviated from the current lane LN from the outside of the curve (during the return control period), it is presumed that the driver is attempting to cause the own vehicle 100 to travel in the current lane LN regardless of whether the operation of the steering wheel 35 is a leftward operation or a rightward operation. Thus, even if the system intervention steering force TQ_S is significantly reduced in accordance with the driver steering operation force TQ_D, the deviation risk is small, and since it is possible to suppress the driver from feeling uncomfortable with the operation of the steering wheel 35 when the system intervention steering force TQ_S is significantly reduced in accordance with the driver steering operation force TQ_D, the vehicle driving support device 10 significantly reduces the system intervention steering force TQ_S in accordance with the driver steering operation force TQ_D.

Figure 7:
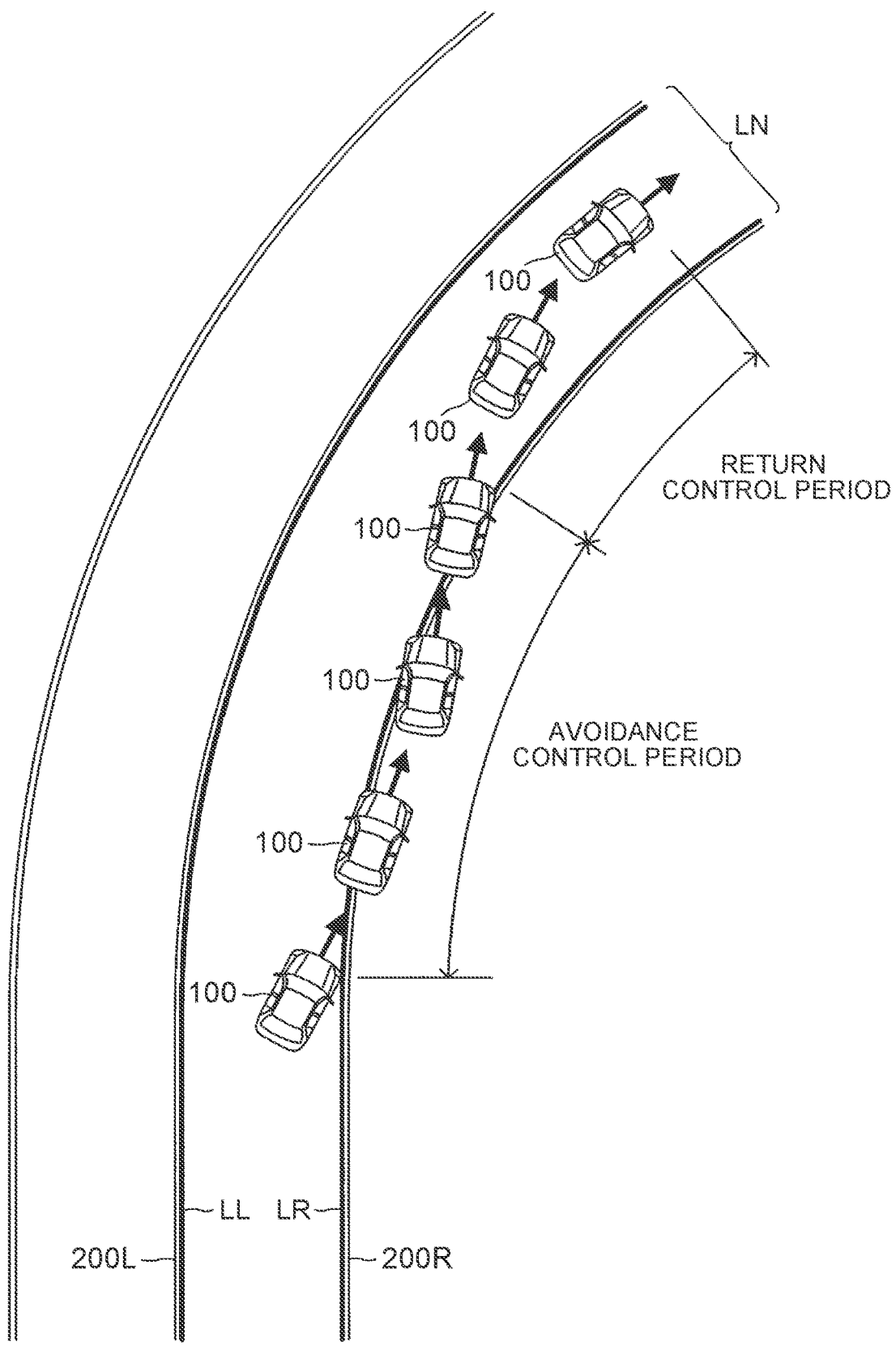
FIG. 7 is a diagram showing a situation in which the own vehicle traveling on a right curve road deviates from the lane from the inside of the curve.

Inner Deviation While Traveling on Right Curve Road
Before Start of Lane Deviation Suppression Control As shown in FIG. 7, when the own vehicle 100 reaches the right side deviation determination line LR (curve inner deviation determination line) while traveling on a right curve road, the vehicle driving support device 10 determines whether a driver steering operation force TQ_D of the same phase (in-phase steering operation force) that is equal to or larger than the first threshold value TQ T or a driver steering operation force TQ_D of the reverse phase (reverse-phase steering operation force) that is equal to or larger than the second threshold value TQ2 is detected.

In other words, the vehicle driving support device 10 determines whether "a control unnecessary condition that the curve inner lane deviation condition is satisfied while the pre-intervention in-phase condition is satisfied" is satisfied and whether "a control unnecessary condition that the curve inner lane deviation condition is satisfied while the pre-intervention reverse-phase condition is satisfied" is satisfied.

The curve inner lane deviation condition here is a condition that the own vehicle 100 has reached the right side deviation determination line LR (curve inner deviation determination line) while traveling on a right curve road. The pre-intervention in-phase condition and the pre-intervention reverse-phase condition used when the own vehicle 100 reaches the right side deviation determination line LR and the curve inner lane deviation condition is satisfied are each the same as the pre-intervention in-phase condition and the pre-intervention reverse-phase condition used when the straight lane deviation condition is satisfied, but may be different conditions by using different values as predetermined values used for determining whether the conditions are satisfied.

In the situation shown in FIG. 7, the driver steering operation force TQ_D of the same phase (in-phase steering operation force) is the driver steering operation force TQ_D in the left (i.e., counterclockwise) direction, and the driver steering operation force TQ_D of the reverse phase (reverse-phase steering operation force) is the driver steering operation force TQ_D in the right (i.e., clockwise) direction.

When the control unnecessary condition is satisfied, the vehicle driving support device 10 continues the normal steering control without executing the lane deviation suppression control.

On the other hand, when the control unnecessary condition is not satisfied, the vehicle driving support device 10 starts the lane deviation suppression control. After the start of the lane deviation suppression control, unless the large width reduction condition and the small width reduction condition described below are satisfied, the vehicle driving support device 10 sets the reference steering force TQbase as the target system intervention steering force TQ_Stgt, sets the target system intervention steering force TQ_Stgt as the target steering force TQtgt, and causes the steering device 23 to output a steering force corresponding to the target steering force TQtgt.

As described above, when the driver is operating the steering wheel 35 in the direction of returning the own vehicle 100 to the current lane LN in the case where the own vehicle 100 traveling on a right curve road may deviate from the right side of the current lane LN (in the case where the curve inner lane deviation condition is satisfied), it is presumed that the driver is operating the steering wheel 35 in an attempt to return the own vehicle 100 to the current lane LN, and thus the deviation risk is small. Therefore, the vehicle driving support device 10 does not execute the lane deviation suppression control even when the driver steering operation force TQ_D at that time is relatively small (that is, when the driver steering operation force TQ_D at that time is equal to or larger than the first threshold value TQ1).

On the other hand, when the driver is operating the steering wheel 35 in the direction of causing the own vehicle 100 to deviate from the current lane LN in the case where the own vehicle 100 traveling on a right curve road may deviate from the right side of the current lane LN (in the case where the curve inner lane deviation condition is satisfied), the deviation risk is large, so that the vehicle driving support device 10 basically executes the lane deviation suppression control. When the driver steering operation force TQ_D at that time is relatively large (that is, when the driver steering operation force TQ_D at that time is equal to or larger than the second threshold value TQ2), it is presumed that the driver is intentionally attempting to cause the own vehicle 100 to deviate from the current lane LN, so that the vehicle driving support device 10 does not execute the lane deviation suppression control.

After Start of Lane Deviation Suppression Control

When the vehicle driving support device 10 starts the lane deviation suppression control, the vehicle driving support device 10 monitors the driver steering operation force TQ_D during the execution of the lane deviation suppression control.

The vehicle driving support device 10 determines whether the driver steering operation force TQ_D of the same phase that is larger than a predetermined value (in this example, zero) or the driver steering operation force TQ_D of the reverse phase that is larger than a predetermined value (in this example, zero) is detected in the avoidance control period after the start of the lane deviation suppression control.

In other words, the vehicle driving support device 10 determines whether "the large width reduction condition that the post-intervention in-phase condition is satisfied during the avoidance control period after the curve inner lane deviation condition is satisfied and the lane deviation suppression control is started" is satisfied, and whether "the small reduction condition that the post-intervention reverse-phase condition is satisfied during the avoidance control period after the curve inner lane deviation condition is satisfied and the lane deviation suppression control is started" is satisfied.

When the large width reduction condition is satisfied, the vehicle driving support device 10 sets the small steering force TQsmall as the target system intervention steering force TQ_Stgt. The vehicle driving support device 10 then sets the total value of the target system intervention steering force TQ_Stgt and the driver required steering force TQ_Dreq as the target steering force TQtgt, and causes the steering device 23 to output a steering force corresponding to the target steering force TQtgt.

The steering force applied to the own vehicle 100 at this time is the steering force in the direction of returning the own vehicle 100 to the current lane LN, and in this example, is a steering force having a magnitude corresponding to the reference steering force TQbase.

On the other hand, when the small width reduction condition is satisfied, the vehicle driving support device 10 sets the large steering force TQlarge as the target system intervention steering force TQ_Stgt. The vehicle driving support device 10 then sets the difference between the target system intervention steering force TQ_Stgt and the driver required steering force TQ_Dreq as the target steering force TQtgt, and causes the steering device 23 to output a steering force corresponding to the target steering force TQtgt.

At this time, the steering force applied to the own vehicle 100 is the steering force in the direction of returning the own vehicle 100 to the current lane LN when the driver-required steering force TQ_Dreq is smaller than the target system intervention steering force TQ_Stgt, and is a steering force in the direction of causing the own vehicle 100 to deviate from the current lane LN when the driver-required steering force TQ_Dreq is larger than the target system intervention steering force TQ_Stgt.

When neither the large width reduction condition nor the small width reduction condition is satisfied, as described above, the vehicle driving support device 10 sets the reference steering force TQbase as the target system intervention steering force TQ_Stgt, sets the target system intervention steering force TQ_Stgt as the target steering force TQtgt, and causes the steering device 23 to output a steering force corresponding to the target steering force TQtgt.

Subsequently, the vehicle driving support device 10 determines whether the driver steering operation force TQ_D larger than a predetermined value (in this example, zero) is detected in the return control period.

In other words, the vehicle driving support device 10 determines whether "the large width reduction condition that the post-intervention steering condition is satisfied during the return control period after the curve inner lane deviation condition is satisfied and the lane deviation suppression control is started" is satisfied.

The post-intervention steering condition used during the return control period after the curve inner lane deviation condition is satisfied and the lane deviation suppression control is started is the same as the post-intervention steering condition used during the return control period after the straight lane deviation condition is satisfied and the lane deviation suppression control is started, but may be different conditions by using different values as predetermined values used for determining whether the conditions are satisfied.

When the large width reduction condition is satisfied, the vehicle driving support device 10 sets the small steering force TQsmall as the target system intervention steering force TQ_Stgt. Then, when the direction of the driver steering operation force TQ_D is the same as the direction of the system intervention steering force TQ_S, the vehicle driving support device 10 sets the total value of the target system intervention steering force TQ_Stgt and the driver-required steering force TQ_Dreq as the target steering force TQtgt, and when the direction of the driver steering operation force TQ_D is different from the direction of the system intervention steering force TQ_S, the vehicle driving support device 10 sets the difference between the target system intervention steering force TQ_Stgt and the driver-required steering force TQ_Dreq as the target steering force TQtgt. The vehicle driving support device 10 thus causes the steering device 23 to output a steering force corresponding to the target steering force TQtgt.

In the case where the direction of the driver steering operation force TQ_D is different from the direction of the system intervention steering force TQ_S, when the driver-required steering force TQ_Dreq is larger than the system intervention steering force TQ_S, the direction of the steering force applied to the own vehicle 100 is the same as the direction of the driver steering operation force TQ_D, and when the driver-required steering force TQ_Dreq is smaller than the system intervention steering force TQ_S, the direction of the steering force applied to the own vehicle 100 is opposite to the direction of the driver steering operation force TQ_D.

On the other hand, when the large width reduction condition is not satisfied, as described above, the vehicle driving support device 10 sets the reference steering force TQbase as the target system intervention steering force TQ_Stgt, sets the target system intervention steering force TQ_Stgt as the target steering force TQtgt, and causes the steering device 23 to output a steering force corresponding to the target steering force TQtgt.

As described above, when the driver operates the steering wheel 35 in the direction of returning the own vehicle 100 to the current lane LN while the own vehicle 100 traveling on a right curve road and having deviated from the current lane LN from the inside of the curve is being returned to the current lane LN by the lane deviation suppression control (during the avoidance control period), it is presumed that the driver is operating the steering wheel 35 in an attempt to return the own vehicle 100 to the current lane LN. Thus, even if the system intervention steering force TQ_S is significantly reduced in accordance with the driver steering operation force TQ_D, the deviation risk is small, and since it is possible to suppress the driver from feeling uncomfortable with the operation of the steering wheel 35 when the system intervention steering force TQ_S is significantly reduced in accordance with the driver steering operation force TQ_D, the vehicle driving support device 10 significantly reduces the system intervention steering force TQ_S in accordance with the driver steering operation force TQ_D.

On the other hand, when the driver operates the steering wheel 35 in the direction of causing the own vehicle 100 to deviate from the current lane LN while the own vehicle 100 traveling on a right curve road and having deviated from the current lane LN from the inside of the curve is being returned to the current lane LN by the lane deviation suppression control (during the avoidance control period), it is unlikely that the driver intentionally attempts to cause the own vehicle 100 to deviate from the current lane LN. Thus, if the system intervention steering force TQ_S is significantly reduced in accordance with the steering operation force TQ_D, the deviation risk is large, so that the vehicle driving support device 10 reduces the width of reducing the system intervention steering force TQ_S.

Further, when the driver operates the steering wheel 35 after the own vehicle 100 is returned to the current lane LN by the lane deviation suppression control while the own vehicle 100 traveling on a right curve road has deviated from the current lane LN from the inside of the curve (during the return control period), it is presumed that the driver is attempting to cause the own vehicle 100 to travel in the current lane LN regardless of whether the operation of the steering wheel 35 is a leftward operation or a rightward operation. Thus, even if the system intervention steering force TQ_S is significantly reduced in accordance with the driver steering operation force TQ_D, the deviation risk is small, and since it is possible to suppress the driver from feeling uncomfortable with the operation of the steering wheel 35 when the system intervention steering force TQ_S is significantly reduced in accordance with the driver steering operation force TQ_D, the vehicle driving support device 10 significantly reduces the system intervention steering force TQ_S in accordance with the driver steering operation force TQ_D.

Figure 8:
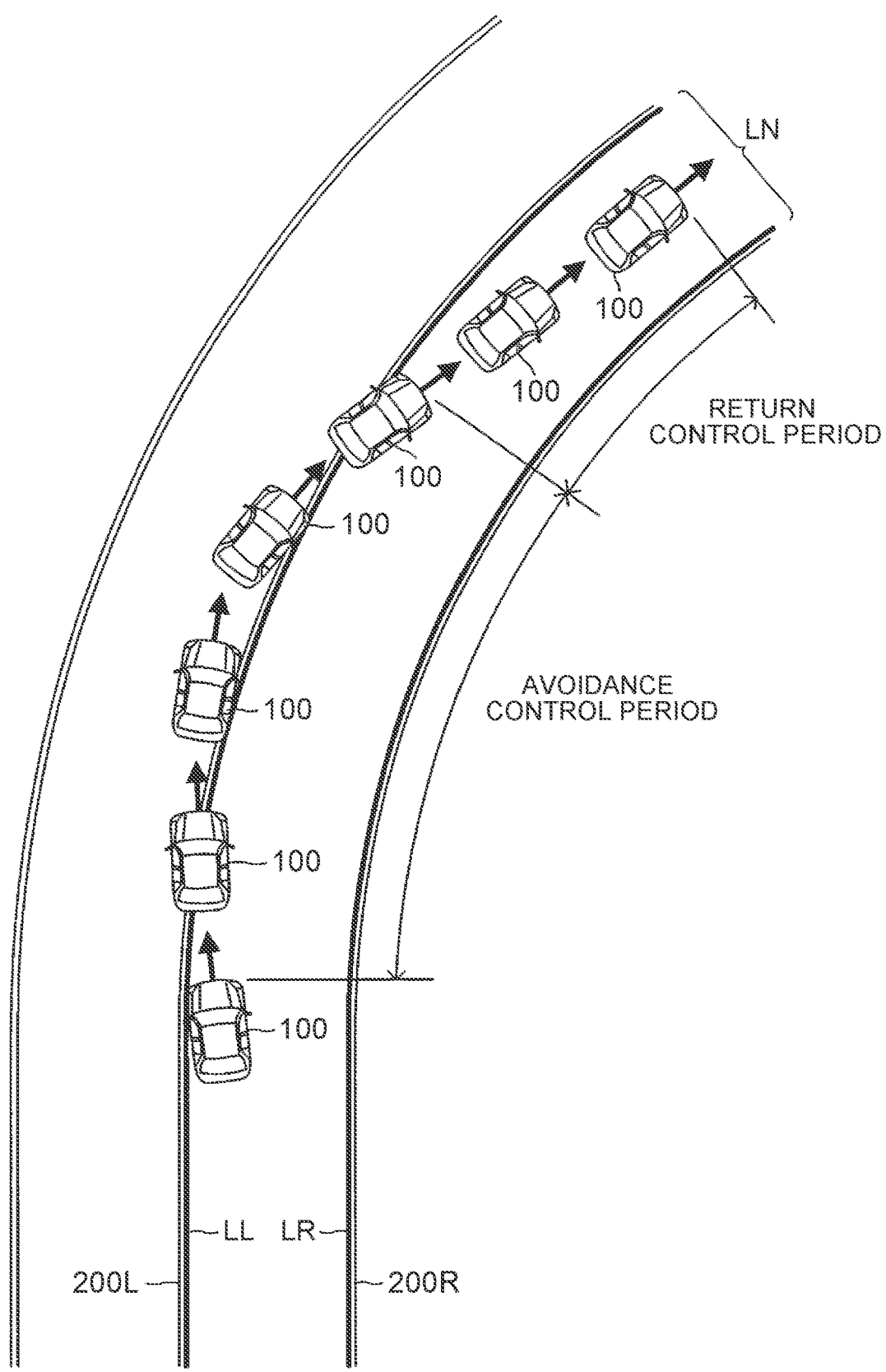
FIG. 8 is a diagram showing a situation in which the own vehicle traveling on the right curve road deviates from the lane from the outside of the curve.

Outer Deviation While Traveling on Right Curve Road Before Start of Lane Deviation Suppression Control As shown in FIG. 8, when the own vehicle 100 reaches the left side deviation determination line LL (curve outer deviation determination line) while traveling on a right curve road, the vehicle driving support device 10 determines whether a driver steering operation force TQ_D of the same phase (in-phase steering operation force) that is equal to or larger than the third threshold value TQ3 or a driver steering operation force TQ_D of the reverse phase (reverse-phase steering operation force) that is equal to or larger than the second threshold value TQ2 is detected.

In other words, the vehicle driving support device 10 determines whether "a control unnecessary condition that the curve outer lane deviation condition is satisfied while the pre-intervention in-phase condition is satisfied" is satisfied and whether "a control unnecessary condition that the curve outer lane deviation condition is satisfied while the pre-intervention reverse-phase condition is satisfied" is satisfied.

The curve outer lane deviation condition here is a condition that the own vehicle 100 has reached the left side deviation determination line LL (curve outer deviation determination line) while traveling on a right curve road. Unlike the pre-intervention in-phase condition used when the straight lane deviation condition or the curve inner lane deviation condition is satisfied, the pre-intervention in-phase condition used when the own vehicle 100 reaches the left side deviation determination line LL and the curve outer lane deviation condition is satisfied is a condition that a driver steering operation force TQ_D of the same phase that is equal to or larger than the third threshold value TQ3 is detected. Further, unlike the pre-intervention reverse-phase condition used when the straight lane deviation condition or the curve inner lane deviation condition is satisfied, the pre-intervention reverse-phase condition used when the own vehicle 100 reaches the left side deviation determination line LL and the curve outer lane deviation condition is satisfied is a condition that a driver steering operation force TQ_D of the reverse phase that is equal to or larger than the second threshold value TQ2 is detected.

In the situation shown in FIG. 8, the driver steering operation force TQ_D of the same phase (in-phase steering operation force) is the driver steering operation force TQ_D in the right (i.e., clockwise) direction, and the driver steering operation force TQ_D of the reverse phase (reverse-phase steering operation force) is the driver steering operation force TQ_D in the left (i.e., counterclockwise) direction.

When the control unnecessary condition is satisfied, the vehicle driving support device 10 continues the normal steering control without executing the lane deviation suppression control.

On the other hand, when the control unnecessary condition is not satisfied, the vehicle driving support device 10 starts the lane deviation suppression control. After the start of the lane deviation suppression control, unless the large width reduction condition and the small width reduction condition described below are satisfied, the vehicle driving support device 10 sets the reference steering force TQbase as the target system intervention steering force TQ_Stgt, sets the target system intervention steering force TQ_Stgt as the target steering force TQtgt, and causes the steering device 23 to output a steering force corresponding to the target steering force TQtgt.

As described above, when the driver is operating the steering wheel 35 in the direction of returning the own vehicle 100 to the current lane LN in the case where the own vehicle 100 traveling on a right curve road may deviate from the left side of the current lane LN (in the case where the curve outer lane deviation condition is satisfied), it is presumed that the driver is operating the steering wheel 35 in an attempt to return the own vehicle 100 to the current lane LN, but the amount of operation of the steering wheel 35 is insufficient, which is causing the own vehicle 100 to deviate from the outside of the right curve road. In this case, the deviation risk is large, so that the vehicle driving support device 10 basically executes the lane deviation suppression control. When the driver steering operation force TQ_D at that time is sufficiently large (that is, when the driver steering operation force TQ_D at that time is equal to or larger than the third threshold value TQ3), it is presumed that the driver is intentionally attempting to cause the own vehicle 100 to deviate from the current lane LN, so that the vehicle driving support device 10 does not execute the lane deviation suppression control.

On the other hand, when the driver is operating the steering wheel 35 in the direction of causing the own vehicle 100 to deviate from the current lane LN in the case where the own vehicle 100 traveling on a right curve road may deviate from the left side of the current lane LN (in the case where the curve outer lane deviation condition is satisfied), the deviation risk is large, so that the vehicle driving support device 10 basically executes the lane deviation suppression control. When the driver steering operation force TQ_D at that time is relatively large (that is, when the driver steering operation force TQ_D at that time is equal to or larger than the second threshold value TQ2), it is presumed that the driver is intentionally attempting to cause the own vehicle 100 to deviate from the current lane LN, so that the vehicle driving support device 10 does not execute the lane deviation suppression control.

After Start of Lane Deviation Suppression Control

When the vehicle driving support device 10 starts the lane deviation suppression control, the vehicle driving support device 10 monitors the driver steering operation force TQ_D during the execution of the lane deviation suppression control.

The vehicle driving support device 10 determines whether the driver steering operation force TQ_D larger than a predetermined value (in this example, zero) is detected in the avoidance control period after the start of the lane deviation suppression control.

In other words, the vehicle driving support device 10 determines whether "the small width reduction condition that the post-intervention steering condition is satisfied during the avoidance control period after the curve outer lane deviation condition is satisfied and the lane deviation suppression control is started" is satisfied.

The post-intervention steering condition used during the avoidance control period after the own vehicle 100 reaches the left side deviation determination line LL, the curve outer lane deviation condition is satisfied, and the lane deviation suppression control is started is the same as the post-intervention steering condition used during the avoidance control period after the straight lane deviation condition or the curve inner lane deviation condition is satisfied and the lane deviation suppression control is started, but may be different conditions by using different values as predetermined values used for determining whether the conditions are satisfied.

When the small width reduction condition is satisfied, the vehicle driving support device 10 sets the large steering force TQlarge as the target system intervention steering force TQ_Stgt. Then, when the direction of the driver steering operation force TQ_D is the same as the direction of the system intervention steering force TQ_S, the vehicle driving support device 10 sets the total value of the target system intervention steering force TQ_Stgt and the driver-required steering force TQ_Dreq as the target steering force TQtgt, and when the direction of the driver steering operation force TQ_D is different from the direction of the system intervention steering force TQ_S, the vehicle driving support device 10 sets the difference between the target system intervention steering force TQ_Stgt and the driver-required steering force TQ_Dreq as the target steering force TQtgt. The vehicle driving support device 10 thus causes the steering device 23 to output a steering force corresponding to the target steering force TQtgt.

In the case where the direction of the driver steering operation force TQ_D is different from the direction of the system intervention steering force TQ_S, when the driver-required steering force TQ_Dreq is larger than the system intervention steering force TQ_S, the direction of the steering force applied to the own vehicle 100 is the same as the direction of the driver steering operation force TQ_D, and when the driver-required steering force TQ_Dreq is smaller than the system intervention steering force TQ_S, the direction of the steering force applied to the own vehicle 100 is opposite to the direction of the driver steering operation force TQ_D.

On the other hand, when the small width reduction condition is not satisfied, as described above, the vehicle driving support device 10 sets the reference steering force TQbase as the target system intervention steering force TQ_Stgt, sets the target system intervention steering force TQ_Stgt as the target steering force TQtgt, and causes the steering device 23 to output a steering force corresponding to the target steering force TQtgt.

Subsequently, the vehicle driving support device 10 determines whether the driver steering operation force TQ_D larger than a predetermined value (in this example, zero) is detected in the return control period.

In other words, the vehicle driving support device 10 determines whether "the large width reduction condition that the post-intervention steering condition is satisfied during the return control period after the curve outer lane deviation condition is satisfied and the lane deviation suppression control is started" is satisfied.

The post-intervention steering condition used during the return control period after the own vehicle 100 reaches the left side deviation determination line LL, the curve outer lane deviation condition is satisfied, and the lane deviation suppression control is started is the same as the post-intervention steering condition used during the return control period after the straight lane deviation condition or the curve inner lane deviation condition is satisfied and the lane deviation suppression control is started, but may be different conditions by using different values as predetermined values used for determining whether the conditions are satisfied.

When the large width reduction condition is satisfied, the vehicle driving support device 10 sets the small steering force TQsmall as the target system intervention steering force TQ_Stgt. Then, when the direction of the driver steering operation force TQ_D is the same as the direction of the system intervention steering force TQ_S, the vehicle driving support device 10 sets the total value of the target system intervention steering force TQ_Stgt and the driver-required steering force TQ_Dreq as the target steering force TQtgt, and when the direction of the driver steering operation force TQ_D is different from the direction of the system intervention steering force TQ_S, the vehicle driving support device 10 sets the difference between the target system intervention steering force TQ_Stgt and the driver-required steering force TQ_Dreq as the target steering force TQtgt. The vehicle driving support device 10 thus causes the steering device 23 to output a steering force corresponding to the target steering force TQtgt.

In the case where the direction of the driver steering operation force TQ_D is different from the direction of the system intervention steering force TQ_S, when the driver-required steering force TQ_Dreq is larger than the system intervention steering force TQ_S, the direction of the steering force applied to the own vehicle 100 is the same as the direction of the driver steering operation force TQ_D, and when the driver-required steering force TQ_Dreq is smaller than the system intervention steering force TQ_S, the direction of the steering force applied to the own vehicle 100 is opposite to the direction of the driver steering operation force TQ_D.

On the other hand, when the large width reduction condition is not satisfied, as described above, the vehicle driving support device 10 sets the reference steering force TQbase as the target system intervention steering force TQ_Stgt, sets the target system intervention steering force TQ_Stgt as the target steering force TQtgt, and causes the steering device 23 to output a steering force corresponding to the target steering force TQtgt.

As described above, when the driver operates the steering wheel 35 in the direction of returning the own vehicle 100 to the current lane LN while the own vehicle 100 traveling on a right curve road and having deviated from the current lane LN from the outside of the curve is being returned to the current lane LN by the lane deviation suppression control (during the avoidance control period), it is presumed that the driver is operating the steering wheel 35 in an attempt to return the own vehicle 100 to the current lane LN, but the amount of operation of the steering wheel 35 is insufficient, which is causing the own vehicle 100 to deviate from the outside of the left curve road. In this case, the deviation risk is large, so that the vehicle driving support device 10 reduces the width of reducing the system intervention steering force TQ_S.

On the other hand, when the driver operates the steering wheel 35 in the direction of causing the own vehicle 100 to deviate from the current lane LN while the own vehicle 100 traveling on a right curve road and having deviated from the current lane LN from the outside of the curve is being returned to the current lane LN by the lane deviation suppression control (during the avoidance control period), it is unlikely that the driver intentionally attempts to cause the own vehicle 100 to deviate from the current lane LN. Thus, if the system intervention steering force TQ_S is significantly reduced in accordance with the steering operation force TQ_D, the deviation risk is large, so that the vehicle driving support device 10 reduces the width of reducing the system intervention steering force TQ_S.

Further, when the driver operates the steering wheel 35 after the own vehicle 100 is returned to the current lane LN by the lane deviation suppression control while the own vehicle 100 traveling on a right curve road has deviated from the current lane LN from the outside of the curve (during the return control period), it is presumed that the driver is attempting to cause the own vehicle 100 to travel in the current lane LN regardless of whether the operation of the steering wheel 35 is a leftward operation or a rightward operation. Thus, even if the system intervention steering force TQ_S is significantly reduced in accordance with the driver steering operation force TQ_D, the deviation risk is small, and since it is possible to suppress the driver from feeling uncomfortable with the operation of the steering wheel 35 when the system intervention steering force TQ_S is significantly reduced in accordance with the driver steering operation force TQ_D, the vehicle driving support device 10 significantly reduces the system intervention steering force TQ_S in accordance with the driver steering operation force TQ_D.

As an example, the vehicle driving support device 10 is configured to determine the necessity of executing the lane deviation suppression control as shown in FIG. 9A, and to apply a steering force to the own vehicle 100 by the lane deviation suppression control.

That is, the vehicle driving support device 10 recognizes the positional relationship between the left side lane marking line 200L and the own vehicle 100 and the positional relationship between the right side lane marking line 200R and the own vehicle 100 based on the image information II (image recognition), and calculates the target system intervention steering force TQ_Stgt based on information such as the result of the image recognition and the steering angle θs (steering force calculation). The vehicle driving support device 10 also performs deviation risk determination based on the result of the image recognition and the driver steering operation force TQ_D.

Then, the vehicle driving support device 10 performs control inexecution selection in which the vehicle driving support device 10 selects not to execute the lane deviation suppression control based on the result of the deviation risk determination, or performs, when the vehicle driving support device 10 does not select not to execute the lane deviation suppression control, steering force adjustment in which the target system intervention steering force TQ_Stgt is adjusted by setting any of the reference steering force TQbase, the small steering force TQsmall, and the large steering force TQlarge as the target system intervention steering force TQ_Stgt based on the result of the deviation risk determination. The vehicle driving support device 10 then calculates the target control amount for the steering device 23 (control amount calculation) based on the adjusted target system intervention steering force TQ_Stgt and the like.

Subsequently, the vehicle driving support device 10 performs control amount adjustment to adjust, based on the result of the deviation risk determination, the target control amount calculated by the control amount calculation, and applies the adjusted target control amount to the steering device 23 to cause the steering device 23 to output the steering force.

Alternatively, the vehicle driving support device 10 may be configured to determine the necessity of executing the lane deviation suppression control and to apply a steering force to the own vehicle 100 by the lane deviation suppression control as shown in any one of FIG. 9B or FIGS. 10A to FIG. 12B.

The configuration may be such that a condition (alert condition) that is satisfied before the straight lane deviation condition, the curve inner lane deviation condition, or the curve outer lane deviation condition is satisfied (that is, before the own vehicle 100 reaches the left side deviation determination line LL or the right side deviation determination line LR) is prepared, and when the alert condition is satisfied, a buzzer generates a buzzer sound or the like to notify the driver that the own vehicle 100 may deviate from the current lane LN.

Further, the configuration may be such that, when the control unnecessary condition is satisfied, the vehicle driving support device 10 executes the lane deviation suppression control instead of not executing the lane deviation suppression control, but executes the lane deviation suppression control by setting the target system intervention steering force TQ_Stgt as described above.

Further, the configuration may be such that, in the case where the lane deviation suppression control is started because the own vehicle 100 may deviate from the current lane LN while traveling on a straight road, the lane deviation suppression control is stopped when the driver steering operation force TQ_D of the same phase becomes equal to or larger than the first threshold value TQ1 or when the driver steering operation force TQ_D of the reverse phase becomes equal to or larger than the second threshold value TQ2 after the start of the lane deviation suppression control. Similarly, the configuration may be such that, in the case where the lane deviation suppression control is started because the own vehicle 100 may deviate from the current lane LN from the inside of the curve while traveling on a curved road, the lane deviation suppression control is stopped when the driver steering operation force TQ_D of the same phase becomes equal to or larger than the first threshold value TQ1 or when the driver steering operation force TQ_D of the reverse phase becomes equal to or larger than the second threshold value TQ2 after the start of the lane deviation suppression control. Further, the configuration may be such that, in the case where the lane deviation suppression control is started because the own vehicle 100 may deviate from the current lane LN from the outside of the curve while traveling on a curved road, the lane deviation suppression control is stopped when the driver steering operation force TQ_D of the same phase becomes equal to or larger than the third threshold value TQ3 or when the driver steering operation force TQ_D of the reverse phase becomes equal to or larger than the second threshold value TQ2 after the start of the lane deviation suppression control.

Effects

As described above, the vehicle driving support device 10 can execute appropriate lane deviation suppression control in consideration of the risk of deviation of the own vehicle 100 from the current lane LN.

In particular, during the execution of the lane deviation suppression control, when the deviation risk is low and the large width reduction condition is satisfied, the system intervention steering force TQ_S is significantly reduced, which makes it easier for the driver to operate the steering wheel 35, whereas when the deviation risk is high and the small width reduction condition is satisfied, the reduction width of the system intervention steering force TQ_S is reduced, which makes it difficult for the driver to operate the steering wheel 35. This makes it possible to execute appropriate lane deviation suppression control in consideration of the risk of deviation of the own vehicle 100 from the current lane LN.

Specific Operation of Vehicle Driving Support Device

Next, the specific operation of the vehicle driving support device 10 will be described. The CPU of the ECU 90 of the vehicle driving support device 10 executes the routine shown in FIG. 13 at a predetermined calculation cycle. Thus, at a predetermined timing, the CPU starts the process from step 1300 of the routine shown in FIG. 13, and advances the process to step 1305 to determine whether the value of the control execution flag X is "0". The value of the control execution flag X is set to "1" when the lane deviation suppression control is executed, and is set to "0" when the lane deviation suppression control is not executed.

When the CPU determines "Yes" in step 1305, the CPU advances the process to step 1310 to determine whether the lane deviation condition (straight lane deviation condition, curve inner lane deviation condition, or curve outer lane deviation condition) is satisfied. When the CPU determines "Yes" in step 1310, the CPU advances the process to step 1315 to determine whether the control unnecessary condition is satisfied. When the CPU determines "Yes" in step 1315, the CPU directly advances the process to step 1395 to temporarily end the processes of this routine. In this case, the lane deviation suppression control is not executed.

On the other hand, when the CPU determines "No" in step 1315, the CPU advances the process to step 1320 to set the value of the control execution flag X to "1". Subsequently, the CPU advances the process to step 1395 to temporarily end the processes of this routine. In this case, the lane deviation suppression control is executed.

When the CPU determines "No" in step 1305 or step 1310, the CPU directly advances the process to step 1395 to temporarily end the processes of this routine.

The CPU further executes the routine shown in FIG. 14 at a predetermined calculation cycle. Thus, at a predetermined timing, the CPU starts the process from step 1400 of the routine shown in FIG. 14, and advances the process to step 1405 to determine whether the value of the control execution flag X is "1".

When the CPU determines "Yes" in step 1405, the CPU advances the process to step 1410 to determine whether the situation where the control end condition is unsatisfied is established. The control end condition is satisfied when the own vehicle 100 is returned to the current lane LN by the lane deviation suppression control and the yaw angle θy of the own vehicle 100 falls within a predetermined angle range. The yaw angle θy is an angle defined by the longitudinal center line of the own vehicle 100 and the center line of the current lane LN.

When the CPU determines "Yes" in step 1410, the CPU advances the process to step 1415 to determine whether the large width reduction condition is satisfied. When the CPU determines "Yes" in step 1415, the CPU advances the process to step 1420 to set the small steering force TQsmall as the target system intervention steering force TQ_Stgt.

Next, the CPU advances the process to step 1440 to set (calculate) the target steering force TQtgt based on the target system intervention steering force TQ_Stgt set in step 1420 and the driver-required steering force TQ_Dreq at that time. Then, the CPU advances the process to step 1445 to send to the steering device 23 a steering command for causing the steering device 23 to output a steering force corresponding to the target steering force TQtgt. Accordingly, the steering force corresponding to the target steering force TQtgt is output from the steering device 23. Subsequently, the CPU advances the process to step 1495 to temporarily end the processes of this routine.

On the other hand, when the CPU determines "No" in step 1415, the CPU advances the process to step 1425 to determine whether the small width reduction condition is satisfied. When the CPU determines "Yes" in step 1425, the CPU advances the process to step 1430 to set the large steering force TQlarge as the target system intervention steering force TQ_Stgt. Next, the CPU advances the process to step 1440 to set (calculate) the target steering force TQtgt based on the target system intervention steering force TQ_Stgt set in step 1430 and the driver-required steering force TQ_Dreq at that time. Then, the CPU advances the process to step 1445 to send to the steering device 23 a steering command for causing the steering device 23 to output a steering force corresponding to the target steering force TQtgt. Accordingly, the steering force corresponding to the target steering force TQtgt is output from the steering device 23. Subsequently, the CPU advances the process to step 1495 to temporarily end the processes of this routine.

On the other hand, when the CPU determines "No" in step 1425, the CPU advances the process to step 1435 to set the reference steering force TQbase as the target system intervention steering force TQ_Stgt. Next, the CPU advances the process to step 1440 to set (calculate) the target steering force TQtgt based on the target system intervention steering force TQ_Stgt set in step 1435 and the driver-required steering force TQ_Dreq at that time. Then, the CPU advances the process to step 1445 to send to the steering device 23 a steering command for causing the steering device 23 to output a steering force corresponding to the target steering force TQtgt. Accordingly, the steering force corresponding to the target steering force TQtgt is output from the steering device 23. Subsequently, the CPU advances the process to step 1495 to temporarily end the processes of this routine.

Further, when the CPU determines "No" in step 1410, the CPU advances the process to step 1450 to end the lane deviation suppression control. Next, the CPU advances the process to step 1455 to set the value of the control execution flag X to "0". Subsequently, the CPU advances the process to step 1495 to temporarily end the processes of this routine.

Further, when the CPU determines "No" in step 1405, the CPU advances the process to step 1495 to temporarily end the processes of this routine.

The above is the specific operation of the vehicle driving support device 10.

The present disclosure is not limited to the above embodiment, and various modifications can be adopted within the scope of the present disclosure.

What is claimed is:

1. A vehicle driving support device including a control device that executes lane deviation suppression control in which an own vehicle is autonomously steered to suppress the own vehicle from deviating from a lane, the control device being configured to set a target steering force based on an intervention steering force and a driver-required steering force during execution of the lane deviation suppression control, the intervention steering force being a force autonomously set as a steering force for returning the own vehicle to the lane, and the driver-required steering force being a force set based on a steering operation force input to the own vehicle by a driver of the own vehicle, and the control device being configured to apply a steering force corresponding to the target steering force to the own vehicle to autonomously steer the own vehicle, wherein:

the control device is configured to start the lane deviation suppression control, set a steering force with a reference value larger than zero as the intervention steering force to set the target steering force, and execute the lane deviation suppression control, when a straight lane deviation condition or a curve inner lane deviation condition is satisfied while a pre-intervention in-phase condition is not satisfied, the straight lane deviation condition being a condition that there is a possibility that the own vehicle deviates from the lane while traveling on a straight road, the curve inner lane deviation condition being a condition that there is a possibility that the own vehicle deviates from the lane from an inside of a curved road while traveling on the curved road, and the pre-intervention in-phase condition being a condition that an in-phase steering operation force is being input to the own vehicle by the driver of the own vehicle, the in-phase steering operation force being a steering operation force that is equal to or larger than a predetermined value larger than zero and that is applied in a direction of returning the own vehicle that has deviated from the lane to the lane, and the control device is configured not to execute the lane deviation suppression control when the straight lane deviation condition or the curve inner lane deviation condition is satisfied while the pre-intervention in-phase condition is satisfied, or is configured to start the lane deviation suppression control, set a steering force smaller than the reference value as the intervention steering force to set the target steering force, and execute the lane deviation suppression control;

the control device is configured to set a steering force smaller than the reference value as the intervention steering force to set the target steering force and execute the lane deviation suppression control, when a post-intervention in-phase condition is satisfied during an avoidance control period, the post-intervention in-phase condition being a condition that the in-phase steering operation force larger than a predetermined value is input to the own vehicle by the driver, and the avoidance control period being a period from when the straight lane deviation condition or the curve inner lane deviation condition is satisfied and the lane deviation suppression control is started until the own vehicle is returned to the lane by the lane deviation suppression control; or the control device is also configured to set a steering force smaller than the reference value as the intervention steering force to set the target steering force and execute the lane deviation suppression control, when a post-intervention steering condition is satisfied during a return control period, the post-intervention steering condition being a condition that a steering operation force larger than a predetermined value is input to the own vehicle by the driver, and the return control period being a period from when the own vehicle is returned to the lane by the lane deviation suppression control until the lane deviation suppression control is terminated after the straight lane deviation condition or the curve inner lane deviation condition is satisfied and the lane deviation suppression control is started; and wherein the control device is configured to:
start the lane deviation suppression control, set the steering force having the reference value as the intervention steering force to set the target steering force and execute the lane deviation suppression control, when a curve outer lane deviation condition is satisfied while the pre-intervention in-phase condition is not satisfied the curve outer lane deviation condition being a condition that there is a possibility that the own vehicle deviates from the lane from an outside of a curved road while traveling on the curved road; and set a steering force larger than the reference value as the intervention steering force to set the target steering force and execute the lane deviation suppression control, when the post-intervention in-phase condition is satisfied during the avoidance control period after the curve outer lane deviation condition is satisfied and the lane deviation suppression control is started.

2. A vehicle driving support device including a control device that executes lane deviation suppression control in which an own vehicle is autonomously steered to suppress the own vehicle from deviating from a lane, the control device being configured to set a target steering force based on an intervention steering force and a driver-required steering force during execution of the lane deviation suppression control, the intervention steering force being a force autonomously set as a steering force for returning the own vehicle to the lane, and the driver-required steering force being a force set based on a steering operation force input to the own vehicle by a driver of the own vehicle, and the control device being configured to apply a steering force corresponding to the target steering force to the own vehicle to autonomously steer the own vehicle, wherein:

the control device is configured to start the lane deviation suppression control, set a steering force with a reference value larger than zero as the intervention steering force to set the target steering force, and execute the lane deviation suppression control, when a straight lane deviation condition, a curve inner lane deviation condition, or a curve outer lane deviation condition is satisfied while a pre-intervention in-phase condition is not satisfied, the straight lane deviation condition being a condition that there is a possibility that the own vehicle deviates from the lane while traveling on a straight road, the curve inner lane deviation condition being a condition that there is a possibility that the own vehicle deviates from the lane from an inside of a curved road while traveling on the curved road, the curve outer lane deviation condition being a condition that there is a possibility that the own vehicle deviates from the lane from an outside of a curved road while traveling on the curved road, and the pre-intervention in-phase condition being a condition that an in-phase steering operation force is being input to the own vehicle by the driver of the own vehicle, the in-phase steering operation force being a steering operation force that is equal to or larger than a predetermined value larger than zero and that is applied in a direction of returning the own vehicle that has deviated from the lane to the lane;

the control device is configured not to execute the lane deviation suppression control when the straight lane deviation condition, the curve inner lane deviation condition, or the curve outer lane deviation condition is satisfied while the pre-intervention in-phase condition is satisfied, or is configured to start the lane deviation suppression control, set a steering force smaller than the reference value as the intervention steering force to set the target steering force, and execute the lane deviation suppression control; and the predetermined value used for determining the pre-intervention in-phase condition when the straight lane deviation condition or the curve inner lane deviation condition is satisfied is set to a value smaller than the predetermined value used for determining the pre-intervention in-phase condition when the curve outer lane deviation condition is satisfied.

3. A vehicle driving support device including a control device that executes lane deviation suppression control in which an own vehicle is autonomously steered to suppress the own vehicle from deviating from a lane, the control device being configured to set a target steering force based on an intervention steering force and a driver-required steering force during execution of the lane deviation suppression control, the intervention steering force being a force autonomously set as a steering force for returning the own vehicle to the lane, and the driver-required steering force being a force set based on a steering operation force input to the own vehicle by a driver of the own vehicle, and the control device being configured to apply a steering force corresponding to the target steering force to the own vehicle to autonomously steer the own vehicle, wherein the control device is configured to:

set a steering force with a reference value larger than zero as the intervention steering force to set the target steering force and execute the lane deviation suppression control, when a pre-intervention in-phase condition is not satisfied during an avoidance control period, the pre-intervention in-phase condition being a condition that an in-phase steering operation force is being input to the own vehicle by the driver of the own vehicle, the in-phase steering operation force being a steering operation force that is equal to or larger than a predetermined value larger than zero and that is applied in a direction of returning the own vehicle that has deviated from the lane to the lane, and the avoidance control period being a period from when a straight lane deviation condition, a curve inner lane deviation condition, or a curve outer lane deviation condition is satisfied and the lane deviation suppression control is started until when the own vehicle is returned to the lane by the lane deviation suppression control, the straight lane deviation condition being a condition that there is a possibility that the own vehicle deviates from the lane while traveling on a straight road, the curve inner lane deviation condition being a condition that there is a possibility that the own vehicle deviates from the lane from an inside of a curved road while traveling on the curved road, and the curve outer lane deviation condition being a condition that there is a possibility that the own vehicle deviates from the lane from an outside of a curved road while traveling on the curved road;

set a steering force smaller than the reference value as the intervention steering force to set the target steering force and execute the lane deviation suppression control, when the pre-intervention in-phase condition is satisfied during the avoidance control period after the straight lane deviation condition or the curve inner lane deviation condition is satisfied and the lane deviation suppression control is started; and set a steering force larger than the reference value as the intervention steering force to set the target steering force and execute the lane deviation suppression control, when the pre-intervention in-phase condition is satisfied during the avoidance control period after the curve outer lane deviation condition is satisfied and the lane deviation suppression control is started.

* * * * *